US005783808A

United States Patent [19]
Josephson

[11] Patent Number: 5,783,808
[45] Date of Patent: *Jul. 21, 1998

[54] ELECTRONIC CHECK PRESENTMENT SYSTEM HAVING TRANSACTION LEVEL RECONCILIATION CAPABILITY

[75] Inventor: Stanley M. Josephson, Dallas, Tex.

[73] Assignee: J. D. Carreker and Associates, Inc., Dallas, Tex.

[*] Notice: The term of this patent shall not extend beyond the expiration date of Pat. No. 5,412,190.

[21] Appl. No.: 584,890

[22] Filed: Jan. 11, 1996

[51] Int. Cl.⁶ .................................................. G06F 17/60
[52] U.S. Cl. ........................................................ 235/379
[58] Field of Search ............................ 235/379; 395/245

[56] References Cited

U.S. PATENT DOCUMENTS

| | | | |
|---|---|---|---|
| 4,264,808 | 4/1981 | Owens et al. | 235/379 |
| 4,270,042 | 5/1981 | Case | 235/379 |
| 4,523,330 | 6/1985 | Cain | 382/7 |
| 4,694,397 | 9/1987 | Grant et al. | 364/408 |
| 4,823,264 | 4/1989 | Deming | 364/408 |
| 4,948,174 | 8/1990 | Thomson et al. | 283/58 |
| 4,974,878 | 12/1990 | Josephson | 283/67 |
| 5,038,283 | 8/1991 | Caveney | 364/403 |
| 5,121,945 | 6/1992 | Thomson et al. | 283/58 |
| 5,237,159 | 8/1993 | Stephens et al. | 235/379 |
| 5,265,007 | 11/1993 | Barnhard, Jr. et al. | 364/408 |
| 5,373,550 | 12/1994 | Campbell et al. | 379/100 |
| 5,412,190 | 5/1995 | Josephson et al. | 235/379 |

FOREIGN PATENT DOCUMENTS

| | | | |
|---|---|---|---|
| 164368 | 10/1982 | Japan | 364/408 |
| 187762 | 11/1982 | Japan | 235/379 |

OTHER PUBLICATIONS

"V Series Item Processing System Tape Input/Output Module", UNISYS brochure, p. 5.

Sales literature describing product by "StarChek" dated Feb. 17, 1995 entitled Star Check—Advance Notification System, p. 6.

Sales literature entitled "Star Systems, Inc.—Overview" by StarChek, p. 12.

Sales literature describing StarChek Advance Notification System dated Jul. 30, 1993, p. 4.

Literature dated Sep. 6, 1993 entitled ". . . While Low Cost Alternative Gets Test Run with Eight Banks," p.1.

Article dated Friday, May 26, 1995, from the "American Banker" entitled Star System Sets up Firm to Market Data Base for Thwarting Check Fraud, by Beth Piskora, p. 1.

Article dated Jul. 1993 from "Checks & Checking" entitled California Banks Leading Assault on Check Fraud, p. 1.

*Primary Examiner*—F. L. Evans
*Attorney, Agent, or Firm*—Hitt Chwang & Gaines, P.C.

[57] ABSTRACT

Disclosed are an improved electronic check presentment ("ECP") system having a non-ECP exceptions notification system incorporated therein and a method of electronically communicating data pertaining to non-ECP exceptions. The method, for use by a presenting bank and a payor bank having check presentment systems between which data related to checks may be electronically transmitted, comprises the steps of: (1) electronically transmitting, from the presenting bank to the payor bank, predetermined presentment information relating to the checks and permitting a determination by the payor bank as to which of the checks are properly payable by the payor bank, (2) comparing records of an exceptions file with records of a receive control file, the exceptions file capable of containing records subject to both ECP and non-ECP exceptions to thereby produce an electronic file of the which of the checks are properly payable by the payor bank and (3) electronically transmitting the electronic file to the presenting bank to thereby provide advance electronic return notification of both ECP and non-ECP exceptions to checks presented by the presenting bank to the payor bank.

28 Claims, 10 Drawing Sheets

ELECTRONIC CHECK PRESENTMENT SYSTEM HAVING TRANSACTION LEVEL RECONCILIATION CAPABILITY

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyrights whatsoever.

CROSS-REFERENCE TO RELATED APPLICATION

This application is related to application Ser. No. 08/236,632 (now abandoned), filed on Apr. 29, 1994, for an "Improved Electronic Check Presentment System having a Non-ECP Exceptions Notification System Incorporated Therein," a continuation-in-part of application Ser. No. 08/023,364 (now U.S. Pat. No. 5,412,190), filed on Feb. 26, 1993, for an "Electronic Check Presentment System Having a Return Transaction Notification System Incorporated Therein," a continuation-in-part of original application Ser. No. 07/731,529 (now U.S. Pat. No. 5,237,159), filed on Jul. 17, 1991 for an "Electronic Check Presentment System."

REFERENCE TO MICROFICHE APPENDIX

A microfiche appendix containing a computer program listing was submitted with the original application and is incorporated herein by reference.

TECHNICAL FIELD OF THE INVENTION

This invention relates to the field of electronic check processing and, more specifically, to a data processing methodology and apparatus that allows all banks that use this invention to transfer and receive check information electronically. This invention is directed, in particular, to an improved electronic check processing system and data processing apparatus that incorporates a system for providing early electronic check return notifications arising from non-electronic check presentment exceptions.

BACKGROUND OF THE INVENTION

For some time, banking institutions have handled the transfer and presentment of checks for payment in a manual fashion. At a specified time each day, a bank sorts all checks presented to it from depositors, Federal Reserve banks and other banks into bundles, with the bundles containing checks for the particular banks on which they are drawn (the "drawee" or "payor" bank). As the bundles of checks are sorted for particular drawee banks, they are segregated into batches of about 300 checks according to their transit/routing numbers. One or more of these batches are then aggregated for shipment to the destination "drawee" or "payor" bank. A cover letter is attached to each shipment of checks that summarizes the contents of the shipment. Such summary information comprises the name of the payor bank, a preassigned transit/routing number associated with the name of the "drawer" or "presenting" bank, the number of checks in the shipment and the total dollar amount of all of the checks in the batch. The cover letter is termed a "cash letter." The presenting bank then transfers by physical transportation means, to the payor bank, the "cash letter", that includes the cover letter and the bundles of checks.

When the payor bank receives the cash letter, it verifies that the contents of the cash letter, i.e., the check amounts, balance with the totals contained on the cover letter. After a check processing function and posting process, the payor bank determines whether enough money exists in the payor customer's account to cover payment of the check and either accepts or rejects payment of the check. The payor bank then notifies the presenting bank regarding any balancing discrepancies or any transactions that are to be returned. The return is accomplished by physical transportation of the returned check to the presenting bank that originally accepted the check.

A typical instance in which this presentment and routing process occurs is when, for example, a bank customer receives a check from another party that is "drawn on" a bank other than the customer's bank and the customer presents the check to the customer's own bank for payment, either in cash immediately or by crediting the customer's account as a deposit. The bank that the check is drawn on is known as the "drawee" or "payor" bank. In order for the customer's bank to collect on the check presented by the customer, the customer's bank, known as the "presenting" bank or bank of first deposit, "presents" the check to the drawee bank for deduction from the account of the drawee bank customer who wrote the check. In this role, the customer's bank becomes the "presenting" bank. Once the drawee bank receives and processes the check, it essentially pays the amount of the check to the presenting bank through a settlement process. In this role, the drawee bank becomes known as or is referred to as the "payor" bank. Additionally, in terms of the delivery of transactions presented to the payor bank by a presenting bank for payment, the payor bank may be referred to as the "destination" bank.

The procedure described above is an over-simplification of the process established for clearing checks between banks. However, it is sufficient to demonstrate the problems associated with such a process. A first problem resulting from the above process is the delay between the time a check is first deposited at the presenting bank and the time the payor bank accepts or rejects the check. The presenting bank has the choice of either placing a hold on the depositing customer's bank account until it is notified of acceptance by the payor bank or it pays out the money to the presenter and incurs the risk that the check will be rejected by the payor bank as an unpaid check.

Many banks choose not to incur such a risk and therefore place a hold on the customer's bank account until it is notified that the check has been accepted and paid, i.e., debited to the payor's bank account. However, the time that it takes for the presenting bank to be notified that a check has been accepted or rejected may take as long as 7 to 10 days. The Expedited Funds Availability Act of 1987, however, places limits on the length of time that a bank may retain a hold on a customer's funds. In most cases, only two days are allowed for local transactions and only three days for nonlocal transactions. These time limits can severely expose a bank to risks of loss and fraud by forcing a bank accepting customers' deposits to release funds to those customers prior to verification that those funds are, in fact, collectable from the payor bank.

To overcome the problem of delay, banks have attempted to automate the process of gathering checks into cash letters, sending and receiving cash letters and reconciling these cash letters against their contents. Such attempts at automation have included the installation of check sorter machines that scan checks at very high speeds and sort these checks into separate bundles associated with each payor bank. Conventional check processing methods employed by most U.S. Banks and other financial institutions now process checks and credits using high speed reader/sorter equipment such as IBM 3890's or Unisys DP1800's. The sorter "reads" information contained on the checks such as the transit/routing number, the bank customer's account number, the check serial number and the amount of the check. This information is contained in a line of symbols at the bottom of each check in Magnetic Ink Character Recognition ("MICR") form in a font called E13B. After reading and validation, the equipment transfers such information through data processing means to electronic data storage devices. Check sorter machines have been used quite successfully and are well known in the art.

Another attempt at automating the check process is the use of computer systems to record and manage the information associated with the check sorting procedure. Such computer systems interface with the check sorter machines and allow the computer systems to build database information associated with each check that is read. This allows an operator of a computer system to obtain information on checks that have been read such as the total number of checks drawn on specific banks and the total dollars of all checks drawn on specific banks. Such systems that accomplish this task are the IBM Check Processing Control System ("CPCS") and the Unisys Transaction Processing System ("IPS").

Although both of the above attempts have benefitted the banking industry, they have failed to address the problem of delays associated with both the transfer of cash letters between banks and the notification of acceptance or non-payment of a check. Better transportation, overnight express and other services have helped to improve the physical transfer of cash letters, but the transfer of the information contained in the cash letters has still been dependent on the physical delivery of the cash letters to each of the payor banks. Such dependence on the physical transfer of the cash letters perpetuates the delay associated with acceptance or non-payment of particular checks.

Another problem associated with the transfer of cash letters between banks is the inability of either bank to specify, for identification purposes, a particular check that was sorted by the other bank's system. As each check is captured on the check sorting machines, a microfilm image is captured and a unique transaction sequence number ("ISN") is assigned by the CPCS or IPS system. The system then maintains a database of ISNs so that it can later identify and find individual checks within the numerous rolls of microfilm. However, since each bank assigns its own ISNs, there is currently no way for one bank to cross-reference its own ISN to that of another bank. Therefore, alternate manual processes and lengthy correspondence has been required to resolve inquiries on each specific check.

Although means have come into existence that allow for wire transfer or electronic transfer of funds ("EFT") from banks, (see Deming, U.S. Pat. No. 4,823,264 and Case, U.S. Pat. No. 4,270,042), these systems have dealt with the transfer of funds between a bank and an individual or corporate customer. Such EFT systems are well known in the industry and have evolved as a limited means of expediting the transfer of funds through electronic means. Electronic flows of payments through networks such as FEDWIRE, CHIPS, SWIFT, CHAPS and Automated Clearing Houses ("ACH") continually move credits and debits through bank accounts. These networks, although providing notice of non-payment of an electronic transaction, do not perform any functions associated with paper checks. No system, prior to the development of the Electronic Check Presentment ("ECP") system disclosed in the parent application, has allowed banking systems to electronically transfer and control the transfer of, the large volume of checks deposited in their institutions every day.

Unisys has developed a "V Series Transaction Processing System Tape Input/Output Module" as part of its IPS. This Input/Output Module creates tape or disk files containing data that is captured during document processing operations. This module allows sending and receiving banks to process transaction information from tape, without the need, in all cases, to receive the paper transactions first. This module consists primarily of data communication, information sorting and comparison, tape and disk file creation and handling and comparison tape and disk file creation and handling and display handler programs and utilities.

The ECP system of which the present invention is a part differs from the Unisys Tape Input/Output Module in certain significant aspects. First, the ECP system comprises a fully electronic means of automatically capturing and transmitting check information to the appropriate banks and allowing them to perform the necessary clearing process tasks, without the need to transfer anything physical, whether a tape file or the physical check presented for payment. The ECP system also provides additional features not present in the Unisys module.

The Unisys Tape Input/Output Module is only applicable for use by presenting and payor banks that use Unisys IPS Check processing equipment and software. The ECP system of which the present invention is a part removes this limitation by enabling users of other hardware and software systems such as IBM to use an electronic means of transferring and processing electronic checks. The Unisys Tape Input/Output Module does not include means to incorporate new and valuable non-MICR data within the ECP record and therefore has no facility to provide a means of preliminary or final notification of unpaid checks, confirmation of payment notices or reclear instructions. The Unisys Tape Input/Output Module does not accommodate the functionality for benefit sharing nor does it examine the contents of the MICR line data to determine the quality of the contents of the MICR line with respect to unreadable digits or missing data. The Unisys Tape Input/Output Module makes no provision for reconciliation between the paper checks and electronic checks unless the paper is in the exact same order as the electronic file. The ECP system of which the present invention is a part does not require that the paper checks and the electronic checks be in the same order for matching and reconcilement. Further, there is no facility under the Unisys Tape Input/Output Module to match unless all data is readable and there are no missing fields within either the paper check or the electronic check.

The Unisys Tape Input/Output Module makes no provision for interfacing to a customer information file ("CIF") to access and store specific information necessary to identify and process transactions for partner banks sharing ECP information, nor does it provide access and storage means for controlling, balancing and extracting information needed to reconcile and settle the ECP transactions between banks.

As has already been described somewhat above, in the United States, banks have existing systems for processing checks and tracking debit and credit transactions for a bank and its customers. These transactions have historically been carried out in the form of physical transactions—checks and credit slips—that are entered into conventional check processing systems in transaction sets comprising credits and their associated checks that have been deposited by the bank's customers. Recent advances in technology, including ECP and image processing, have made it possible to allow the encoded information contained on the MICR line of such documents to be extracted from the physical transactions and transferred to requisite destinations apart from the physical transactions themselves. The ECP system of which the present invention is a part takes advantage of the advances in technology in order to provide a system for incorporating additional valuable information together with the encoded information extracted from physical documents and to provide a means for the electronic transfer of this expanded information between and among cooperating banks in a manner that improves the efficiency and accuracy of the accounting and check clearing processes and avoids the delays typically associated with transporting physical documents from bank to bank. In conventional systems for data capture, checks and credit slips are preconditioned for processing and are read through high speed reader/sorter machines, with groups of documents being processed in transaction sets. During this high speed capture process, the credit portion of the transaction set is first read and validated and information contained on the credit slip's MICR line is extracted and stored in a data base. Then, the associated debits are read, validated, balanced to the credit slip and stored on the data base as associated with the corresponding credit. The physical documents are microfilmed, a unique ISN is assigned and the documents are directed to a designated pocket of the reader/sorter as either "on us" for those transactions drawn on the bank performing the capture and sorting operations or as "transit" for those transactions drawn on all other banks. The transit transactions are directed to multiple pockets corresponding to the specific bank on which the check was drawn, i.e., the payor bank, to a correspondent of the payor bank or to specific Federal Reserve Districts or Cities. The segregated checks are then wrapped with a computer-printed detail list and cash letter covering report for each group of checks and the groups are dispatched via ground or air transportation to the other banks for further processing. When ECP means are used, the information that has been extracted from the checks is used to prepare electronic files for early data transmission to the other banks and the physical groups of checks and their listings and Cash Letters are dispatched at a later time.

When the checks are received by the payor bank for debiting the payor's account or, alternatively when ECP is used, when the ECP transmission is received, processing is performed to debit the affected payor's account. This process is known generally as Demand Deposit Accounting ("DDA"). As a result of the DDA process, conditions may occur that will not allow the check to be debited to the payor's account. Such conditions include, for example, insufficient balances, uncollected balances, stop payment orders and other irregularities. Each exception typically requires review by a bank officer to determine whether the check should be paid or whether the check should be returned to the presenting bank or bank of first deposit that submitted the check for payment. If the check is returned, it is physically sent to that bank and a decision is made by a bank officer to either re-present the check to the payor bank by reinitiating the entire clearing process in the hope that sufficient funds are then available to pay the check or to notify the original depositor that the check was unpaid and is to be returned to the depositor, with the depositor's account being debited for the unpaid check as a charge back. This decision process is a manual process that requires the bank officer to examine the check and, in the majority of cases, to review prior instructions provided by the depositor to determine the appropriate disposition of the return check.

This return decision process, along with the physical delivery of the unpaid check, can take several days. During this time period, the bank of first deposit experiences a loss of funds and a potential loss through fraud. The original depositor also experiences the delay and this, in turn, may result in losses to them and in delays in initiating the collection process. The Expedited Funds Availability Act of 1987 offers some degree of protection to the bank of first deposit, but it is limited to high value returns of over two thousand five hundred dollars, by requiring twenty-four hour notification by the payor bank to the bank of first deposit. Further, that bank of first deposit is required to notify the original depositor of the return.

Accordingly, the system of which the present invention is a part overcomes the disadvantages inherent in the above systems by providing a means for initiating an immediate electronic preliminary notification to the bank of first deposit, through ECP means, of non-payment of a check as a result of an exception condition detected during the DDA process. This detection and notification is applicable to all checks regardless of their value. After subsequent examination of each potential return check by a bank officer, a final pay or no pay decision is made. If the check is to be returned as unpaid, a final return notification is electronically prepared and also transmitted to the bank of first deposit through ECP means.

Additionally, the system of which the present invention is a part provides a means to incorporate instructions within the ECP transmission for the handling of each return check at the time of the initial capture at the bank of first deposit such that the payor bank has instructions as to the method of handling the check in the event it is to be returned as unpaid. These instructions may request that the payor bank resubmit the check to their DDA system on subsequent processing days to determine if sufficient funds are available to pay the check, thus avoiding a lengthy and costly manual process.

Other systems directed to the accounting functions of debiting and crediting bank account and other financial records have been disclosed in U.S. Pat. No. 4,948,174 to Thomson et al., U.S. Pat. No. 4,974,878 to Josephson and U.S. Pat. No. 5,121,945 to Thomson et al. These patents generally disclose methods of creating electronic data from physical checks or other types of non-negotiable paper documents to effect certain banking and accounts receivable functions. The disclosed methods differ from the method and system described in this application, however. The system uses electronic transmission of check related data, but also combines instructions for the disposition of an unpaid check within the electronic check record. No means for providing any such preliminary notification is disclosed in any of these patents. Only a final notification can be provided in accordance with the systems disclosed and no electronic notification is possible. Only written instructions can be provided, for visual inspection upon receipt. U.S. Pat. No. 5,121,945 to Thomson et al. (the '945 patent) discloses a system affecting the accounting functions of debiting and crediting a bank's account records, a payer's bank account records and a corporation's account receivable records with customer payments by creating an integrated document comprising an invoice and a negotiable instrument, generally a check. The claimed invention comprises an integrated billing document having two portions and various specific features as specified in the claims, for use in invoicing and bill paying processes.

U.S. Pat. No. 4,948,174 to Thomson et al. (the '174 patent) also discloses a system for preparing an integrated billing document. These documents are generated and sent by a corporation to its customers. Upon receipt by the customer, the billing portion of the document is removed, the check is signed and dated by the customer and it is mailed back to the corporation. The corporation groups these checks upon receipt and prepares a deposit for their financial institution. Upon deposit, conventional data processing methods used in a bank's check processing operations perform the validation, microfilming, capture and pocketing of each of the checks in the deposit. As part of the process, the corporation has access to remittance data that can be used by the corporation's accounts receivable system to automatically update each customer's account receivable record with the payment date.

The '945 patent and the '174 patent both provide means to incorporate coded instructions within the preprinted endorsement on the rear of the preprinted check. These coded instructions instruct the payor bank and the depository bank as to the method of dispositioning that check in the event it is returned as unpaid. Neither of the patents discloses any automated means of providing instructions as to the disposition of a return check using electronic check presentment means.

U.S. Pat. No. 4,974,878 to Josephson (the '878 patent) discloses a financial data processing system using payment coupons that relates to bill paying processes and systems. The '878 patent discloses the use of a payment coupon that enables automatic preparation of a preauthorized draft that can then enter and be processed by a conventional check clearing network. The disclosed system incorporates machine readable data that allows automatic extraction from a data base to enable preauthorized drafts to be automatically printed or an electronic funds transfer to be made. The use of a data base allows information to be incorporated within the record used to originate the electronic funds transfer. This information is then carried forward to the payor bank and can be used to initiate a return notification through the existing EFT process used for electronic returns. The '878 patent is intended for electronic funds transfer use only, however. It is not intended for use with checks that are handled in the ordinary course or that have been converted to electronic check presentment means.

None of the three patents cited discloses a system such as that of the system of which the present invention is a part. None of the three patents cited discloses a system that provides a means of electronic submission from a sending bank to a payor bank that allows coded instructions to be incorporated that can initiate a preliminary notification of return through electronic means. Additionally, none of the three patents uses a coding method that can cause a return unpaid check to be identified as one of those to be automatically recleared or as one of those where a notification is required that those checks were successfully paid by the payor bank.

Electronic notification of return checks within a banking system is not practiced in the United States as yet. In the United Kingdom and Ireland, electronic notification of return checks is accomplished in accordance with the following process. Processed checks are returned to the account-holding branch where a physical examination of the checks is made for possible technical reasons for a return such as missing signature or irregular signature problems, post-dated or stale-dated checks, etc.. Next, an officer examines all checks identified as being unable to be paid because of an exception condition such as insufficient funds, closed account, stop payment order, etc., as determined either from output reports or through on-line access to the account balance files for those checks in question. All checks that are to be returned are then physically selected and the bank or branch of first deposit is determined from the stamped endorsement. The information contained on the check, including the date, amount, account number, account holder name and return reason, is entered into an on-line system operated by the Banker's Automated Clearing System ("BACS"). BACS is similar in operation to the Automated Clearing Houses ("ACH") in the United States. BACS then transmits the return check information, known as a "claim for unpaid," to the bank or branch of first deposit. Finally, the physical check is sent, either by mail or by physical delivery, from the account holding branch to the bank or branch of first deposit.

In this system used in the United Kingdom and Ireland, the bank or branch of first deposit can use the transmitted data to place holds on a depositor's account, notify the depositor of the return or take other action to protect against loss of funds. The data may also be used to reconcile the claim for unpaid record to the physical check. The claim for unpaid record may also be used for accounting purposes.

There are significant differences between the method used in the United Kingdom and Ireland for providing some type of return notification and the system of which the present invention is a part. The U.K. method uses no electronic check presentment methods whatsoever. Therefore, the physical check must be examined. Further, there is no provision for any preliminary notification; only a final notification can be provided or used in the U.K. system. Still further, the U.K. system uses no encoded instructions such as are contained in the ECP records of the system of which the present invention is a part. Finally, the U.K. system provides no mechanism for including any disposition coding structure to alert the payor branch or bank of the requirement for a re-presentment of a check.

What is needed in the art is a return transaction notification system that operates in conjunction with non-ECP exceptions, thereby avoiding a need to resort to conventional, paper-based communication of non-ECP exceptions between banks.

SUMMARY OF THE INVENTION

To address the above-noted deficiencies of the prior art, it is a primary object of the present invention to provide a system for electronically processing and providing return transaction notification for all exceptions—regardless of ECP or non-ECP processing—that arise during the DDA process, eliminating a need to undertake interbank communication via conventional, paper-based systems and further significantly facilitating manual check reconciliation procedures.

Accordingly, in the attainment of the above-noted primary object, the present invention provides an improved ECP system having a non-ECP exceptions notification system incorporated therein and a method of electronically communicating data pertaining to non-ECP exceptions. The method, for use by a presenting bank and a payor bank having check presentment systems between which data related to checks are electronically transmitted, comprises the steps of: (1) electronically transmitting, from the presenting bank to the payor bank, predetermined presentment information relating to the checks and permitting a determination by the payor bank as to which of the checks are properly payable by the payor bank, (2) comparing records of an exceptions file with records of a receive control file, the exceptions file capable of containing records subject to both ECP and non-ECP exceptions to thereby produce an electronic file of which of the checks are properly payable by the payor bank and (3) electronically transmitting the electronic exceptions file to the presenting bank to thereby provide advance electronic return notification of both ECP and non-ECP exceptions to checks presented by the presenting bank to the payor bank.

The present invention makes use of the electronic file to perform a reconciliation process to determine differences between the information extracted from each of the physical checks' MICR line and the information contained in the electronic file for each corresponding check. This comparison greatly simplifies the manual reconciliation process by detecting differences that are the result of physical check handling errors, equipment malfunctions, exception conditions and other discrepancies inherent in check processing operations. The automated reconcilement greatly improves the productivity of the reconcilement function because the reconciling clerk is able to use the automated difference report produced during the comparison process to quickly balance the paper cash letter. Differences such as missing checks, duplicate checks, extra checks, misread amounts and other invalid information can be identified on the difference report, allowing adjustments to be made prior to initiation of an account update or DDA process.

To further facilitate the reconciliation process, the present invention incorporates the necessary logic to compare the electronic MICR line to the physical check MICR line when an exact full MICR line match is not possible. For example, if all information except one digit of the account number agrees, the correct digit can be calculated by certain check digit algorithms (including checksums and cyclical redundancy checks) and the erroneous digit can be automatically replaced to allow a full match to take place. Many other type of digit replacement may be accommodated using arithmetic techniques.

Yet another use for the electronic file is to perform the function of early detection of stop payment suspect checks. The present invention enables this function upon receipt of a file of stop payment orders issued by customers of the receiving bank. This stop payment file is used to match the incoming paper checks with a file of stop orders used in conventional bank data processing systems. Through the use of the electronic file, prior to the receipt of the paper checks, a matching stop order can be detected and corrective action taken well in advance of the receipt and processing of the paper, thereby eliminating some potential losses to the receiving bank or the receiving bank's customer.

In conjunction with the stop payment match process, it is also possible to match the electronic file to a file created during the time the checks were first printed (the "issue file") by a corporate customer. This process under conventional methods is called an account reconciliation process ("ARP") or check reconciliation process ("CRP"). The conventional process, in contrast to the method of the present invention, requires that the issue file be matched with the physical checks after the checks have been debited to the corporate customer's account. With the present invention, the issue file is matched to the electronic check file prior to receipt of the physical check, thereby detecting mismatches (checks that were never issued or checks on which the check amount has been altered) prior to check processing. The advantage of this prior detection is that fraud can be detected and action taken at an earlier time.

Another advantage of the present invention is that initiation of Preliminary Notification of Return Checks ("PRNOTEs") can be made when the electronic file is not also being used to perform DDA processing. This is accomplished by using the electronic file to extract matching exception transactions that were created as a result of the conventional DDA paper posting process. This method of processing is then completely compatible with that of the RNOTEs system described herein that uses the electronic file for the DDA posting function.

The foregoing has outlined rather broadly the features and technical advantages of the present invention so that the detailed description of the invention that follows may be better understood. Additional features and advantages of the invention will be described hereinafter that form the subject of the claims of the invention. Those skilled in the art should appreciate that the conception and the specific embodiment disclosed may be readily used as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
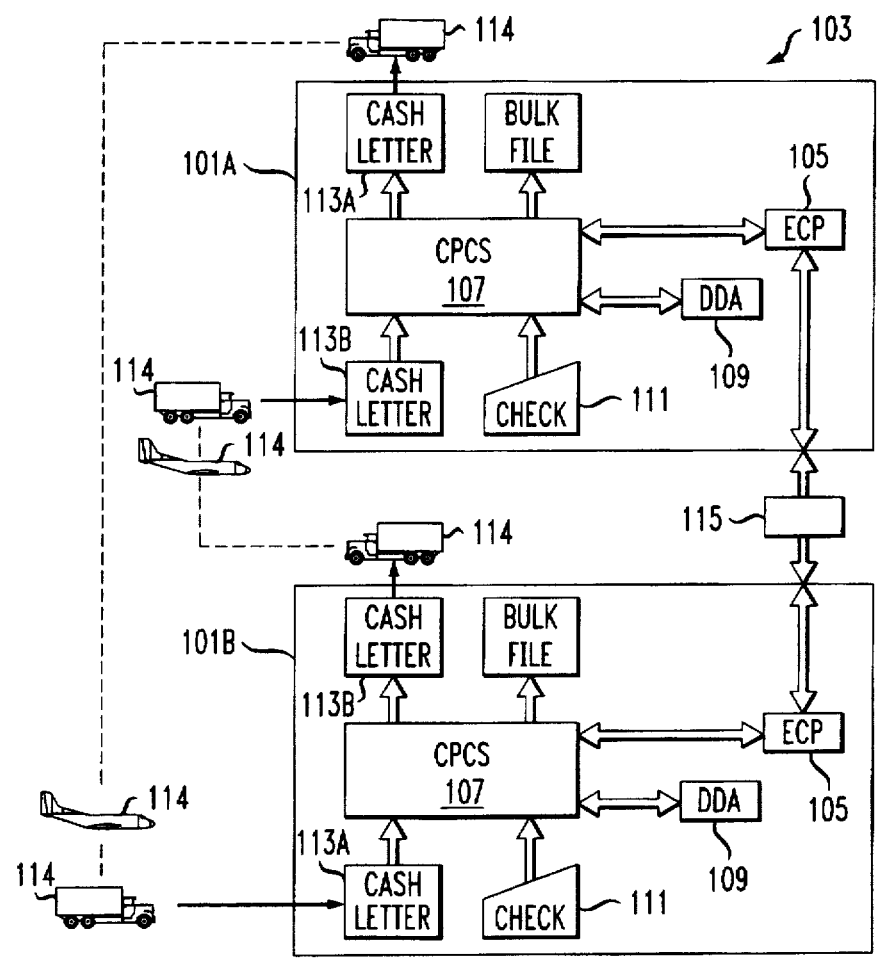
FIG. 1 is a schematic representation of the work flows within an electronic check presentment system.

Referring initially to FIG. 1, partner banks 101 participate in an Electronic Check Clearing House Organization ("ECCHO") exchange program 103. There is no limit on the number of banks that may participate in these electronic exchanges. Typically, each partner bank in the exchange has a check capture system 107, such as the industry standard check processing control system ("CPCS") of International Business Machines Corporation or Unisys Corporation's transaction processing system ("IPS") and a DDA system 109. All are data processing systems having various configurations well known in the art. (For purposes of nomenclature, the check capture system 107 is referred to in the accompanying drawings and descriptions as the "CPCS"). Additionally, when participating in the electronic exchanges, each bank has an ECP system 105 that is interfaced to the CPCS 107. The ECP system 105 may run on the same data processing equipment or computer system as the CPCS 107 or the DDA 109. The CPCS 107, DDA 109 and ECP 105 systems are used as follows in an electronic presentment system.

Partner banks 101A and 101B receive paper checks 111, usually deposited by their respective customers. After their deposit or cashing, the checks are "captured" by the CPCS 107, usually after the close of business on the day they are received. The capture process begins by passing the checks through check sorting machines (not shown). The sorters read characters on each paper check that are printed with magnetic ink and are provided to a magnetic ink character recognition ("MICR") system for conversion to data to be stored in a CPCS mass data storage file ("MDS") (not shown). The printed characters are sometimes collectively referred to as the MICR line and the complete set of MICR-line data is sometimes called a check "image" or "code line," as it contains most of the pertinent data on the check. The records in the CPCS MDS include fields for the transit/routing number of the payor bank (the bank on which the check is drawn), the account number of the customer who wrote the check, the serial number of the check and its amount. Based on the transit/routing number on the check, the CPCS 107 directs the sorter to pocket the check for the bank on which it is drawn.

At various times throughout each business day, the CPCS 107 generates a cash letter 113 for each bank for which there are checks. The checks that are pocketed for each bank are then bundled with the respective cash letter. Collectively, the checks and the letter are simply referred to as a cash letter 113. Assuming both banks 101A and 101B have checks drawn on the other bank, banks 101A and 101B deliver cash letters 113A and 113B, respectively, to the other bank via a courier service 114 that physically transports the cash letter 113 to the respective bank.

Once the cash letter 113 has been produced, the ECP system 105 at each bank prepares, using the same MICR line stored in the CPCS MDS data file, electronic cash letters for each "paper" cash letter 113A and 113B that is sent. This electronic cash letter is then sent to the respective banks, using standard communication techniques over one or more electronic or optical data transmission networks 115.

Once received, the electronic cash letters are processed the same day by the receiving bank's ECP system 105 and CPCS 107. Generally, this involves having the ECP system 105 first perform certain preprocessing functions and then present this electronic cash letter containing the MICR information to the CPCS 107. The CPCS 107 then "captures" the checks in the electronic cash letter as if they were physical paper transactions and sends some or all of these checks to the bank's posting systems, such as the DDA 109. This is called a "non-MICR" capture, as the information is not being read by the CPCS 107 from the magnetic ink characters on the paper checks, but from a "non-MICR" file created by the ECP system 105.

The couriers 114 usually deliver the paper cash letters 113A and 113B to the banks the next business day. Upon arrival, the paper checks are placed in the CPCS 107 sorters at the receiving banks for capture by the CPCS system 107. After capture, the ECP system 105 reconciles the electronic and the paper cash letters with the MICR line. The checks are then handled in the usual manner by the banks.

Figure 2:
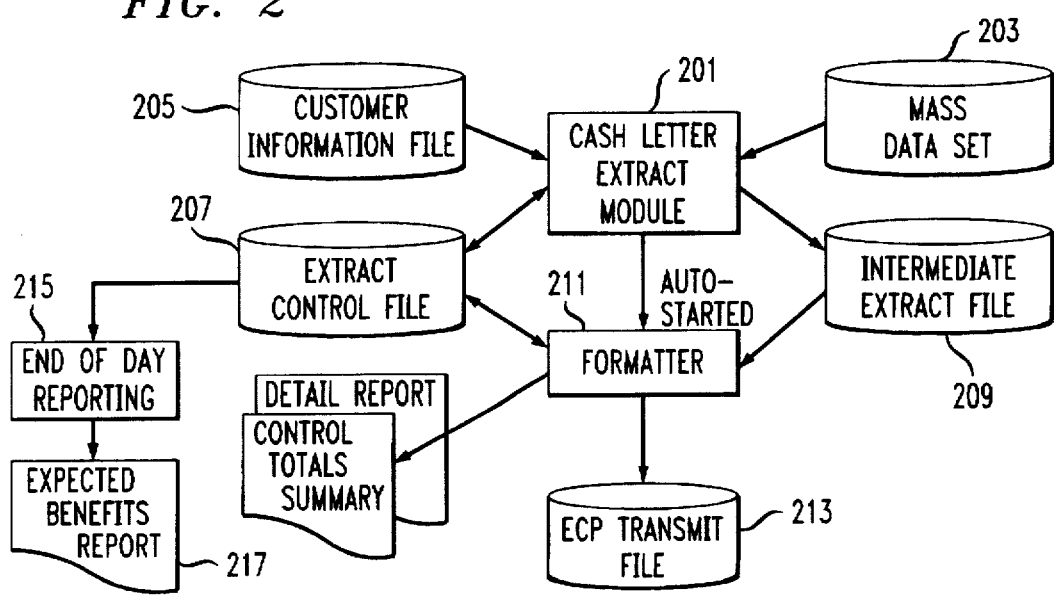
FIG. 2 is a schematic representation of a send sub-system for the electronic check presentment system.

The foregoing is a general description of the functioning of a basic ECP exchange. FIGS. 1 and 2 illustrate further details of the ECP system. Basically, the ECP System has two major sub-systems: 1) the Send system; and 2) the Receive system. An Additional but critical component of the ECP system is an on-line customer information file ("CIF") 205 system, that is common to both the Send and the Receive sub-systems and will be first discussed without reference to the drawing figures. In the preferred embodiment, the ECP is implemented with a general purpose digital computer whose operation is directed by a program such as the one disclosed in the microfiche appendix submitted with the parent of this application and that has been incorporated herein by reference.

The On-Line CIF System

The On-Line CIF system handles, among other things, on-line maintenance of partner bank records, benefit sharing percentages and edit rules. It also provides a complete data base file list and audit control reporting.

The majority of all benefits derived from the ECP process accrue to the bank receiving the electronic cash letter. Partnership agreements allow each receiving bank to negotiate benefit sharing arrangements independently with each prospective exchange partner, to provide an incentive to the partner for sending electronic cash letters to that bank. A key element of the system, then, is the centralized storage of each of these agreements within a single data base file.

Additional data stored in the CIF system include fields of a general nature that identify the name of the partner banks, the primary contacts at the partner banks (for both sending and receiving data) and the telephone number(s) for the primary contacts. Data fields that are more specific are defined to include identification numbers for the partner banks, such as transit/routing numbers, version numbers of the record formats to be sent to and received from the partner banks, send and receive cut-off times that define the target deadlines for the partner banks, send and receive volume cut-offs that identify the maximum number of transactions allowed for each bank's transmission and send and receive cash letter maximums that define the maximum number of cash letters allowed for transmission to and receipt from each partner bank.

The CIF system also includes fields that pertain to benefit sharing for each of the partner banks. These fields store the benefit percentages to be applied to the electronic cash letters that are sent to or received from the partner banks for each day of the week. Finally, the CIF system includes fields that are used to maintain information relating to the partner bank's records such as the date and time associated with the last update of the CIF records, as well as identification of the bank employee responsible for the last update.

The maintenance portion of the CIF system comprises modules for adding, updating and deleting partner bank CIF records. The Add function allows an authorized bank employee to input all partner bank data as detailed in the section discussed above. The system contains logical edits that prevent a bank employee from entering duplicate records (based on record type and bank-ID fields). In addition, the system does not allow for sending data to or receiving data from, partners with whom such exchanges have not been authorized in the CIF. To ease the entry of information into the Add screen, the CIF system automatically inserts the current date, time and operator ID into each new record.

The Edit/Update portion of the CIF system prompts the bank employee to enter the bank identification number for the requested record. The system then displays an edit screen, similar to the Add screen, that contains the data for the requested bank. The system allows an authorized bank employee to modify all fields within the screen except the record type, bank-ID and last update fields. In addition, the Edit/Update portion of the CIF system provides the same logical edits and automatic entries that are available in the Add portion.

The Delete/Undelete portion of the CIF system allows an authorized bank employee to mark a bank record as deleted as of a specified date. The Delete/Undelete portion prompts the bank employee to enter the bank-ID number for the requested record. It then displays a screen, similar to the Add screen, containing information for the particular bank requested. The Delete/Undelete portion allows the bank employee to close the account by entering an account closed date into the system. If, at a later time, the bank employee wishes to re-open an account, it can be done by entering zeros in the account closed date field.

The CIF system also includes audit reporting features that detail the changes made to the CIF database, whether through Adds, Edits or Deletes. The system prompts the bank employee to enter the start date for the report, with the end date of the report being the current system date. The CIF system scans the CIF database and selects only those records that fall within the date range specified. The system then formats and prints a list of all data fields along with the corresponding changes to the data fields. In addition to these features, the CIF system includes the ability to print out a detailed listing of all partner bank records currently on the CIF database.

The Send System

Figure 3:
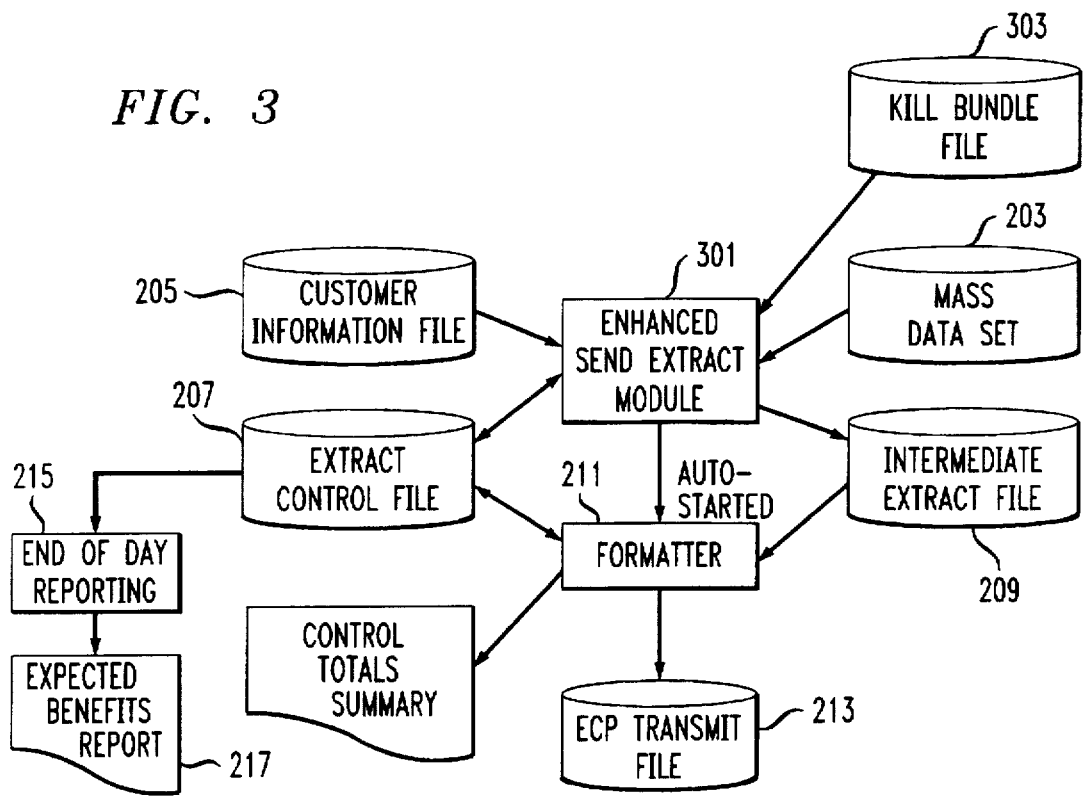
FIG. 3 is a schematic representation of an alternate embodiment of the send sub-system.

Referring now to FIGS. 2 and 3, the Send portion of the Electronic Check Presentment System automatically handles the selection and extraction of targeted cash letters from the CPCS 107 system. The Send portion may be divided into two different segments that address the diverse requirements of the marketplace: a Basic Send segment, that is Cycle and String based, shown in FIG. 2 and an Enhanced Send segment, that is Cash Letter and Kill Bundle-based, shown in FIG. 3.

Referring now to just FIG. 2, the Basic Send segment provides an on-line capability for initiating the creation or recreation, of an electronic cash letter file. The cash letter file is, in essence, a sequential file suitable for transmission to partner banks. The Basic Send segment includes a cash letter extract module 201. This cash letter extract module 201 allows the user to select a specific destination bank, called an end point, extract all transactions associated with this end point and create an electronic file of this data for conversion into a standard format. The user is first prompted to enter the specific cycle to be extracted from all cycles in the CPCS mass data set 203. The extract module 201 uses the CIF file of bank records 205, discussed in the CIF system above, to dynamically build and display a screen containing all the bank names on file. The user can then select a particular bank or end point for extraction. The cash letter extract module then extracts all transaction records from the CPCS mass data set 203 that correspond to the selected end point and cycle requested. Upon extraction, the module builds an intermediate extract file 209 that is auto-started and used by the formatter module 211. After building the intermediate extract file 209, the extract module 201 formats and prints a paper detail report of all extracted transactions and writes a summary record to an extract control file 207 containing the extracted end point and summary totals of amounts and transaction counts at the bundle level of all cash letters extracted for electronic transmission. The extract control file 207 provides data for end of the day reporting 215, including an expected benefits report 217.

The formatter module 211 is automatically started from the cash letter extract module 201 after the extract module builds the intermediate extract file 209. The module examines the bank records in the customer information file ("CIF") 205 to determine the proper record format version number currently in use by the specific end point bank for which the extraction was done. It then builds an electronic cash letter file, termed an ECP transmit file 213.

The ECP transmit file 213, in the selected format, comprises check detail records, cash letter and batch headers, cash letter and batch trailers. In the system of which the present invention is a part, the check detail records include fields for the paying banks routing transit number, the payor's account number, the amount of the check, the check serial number, the ISN assigned by the sending bank and coded instruction fields that indicate whether the sending bank anticipates benefit sharing and whether the check being transmitted is eligible for preliminary notice of return or final return notice of return. As a result of the RNOTEs system, the check detail record may also include optional fields for storing such information as the depositor's account number, the disposition instructions in the event the check is returned, the originating bank's routing transit number, the date and time the cash letter was created and the cash letter number.

A file header exists for each electronic cash letter file. The file header includes the selected format version number for the receiving bank, the routing transit number of the presenting bank, the date and time the file was created and the name of the presenting bank. A file trailer also exists for each electronic cash letter file. This trailer includes the total dollar amount of all check records in the file, the total number of cash letters in the file and the total dollar amount of all eligible benefit sharing records in the file.

The ECP transmit file 213 also contains a cash letter header for each cash letter extracted. This header includes the routing transit numbers of both the origination bank and the destination bank, the date and time the cash letter was created, the date the electronic cash letter file was created, the cash letter number and the name of the originating bank.

A cash letter trailer also exists for each cash letter in the file. This trailer includes some of the information contained in the cash letter header, as well as the total dollar amount of the cash letter.

A third header in the electronic cash letter is the batch header. A batch header exists for each batch that was extracted from the CPCS mass data set 203. The batch header includes the transit/routing numbers of both the origination and destination banks, the date the batch was processed, the bundle identification, the bundle number and the cycle number. A batch trailer record is also created for each batch extracted in the electronic cash letter. The batch trailer includes the total number of all check records in the batch, the total dollar amount of all check records in the batch and the total dollar amount of all eligible benefit sharing check records in the batch.

In addition to the cash letter extract module 201, the Basic Send segment of the Send system illustrated in FIG. 2 also includes an extract re-run module (not shown). This module allows re-creation of a file that has been previously extracted. Upon completing the extraction, this module compares the results of the extraction with those of the previous extraction. If the module detects a change in the information obtained through the extraction, it prepares a notification that a particular data file or string, is missing and identifies the missing string name, bundle number, bundle amount and transaction count.

The Basic Send segment also contains an extract re-start module (not shown) that allows re-start of an extract job that failed due to a program or system problem. Upon execution, the module creates a completely new extract file for the requested end point.

In addition to the above modules, the Basic Send segment includes a number of utilities that enhance the Send system. One of the utilities, end of day reporting module 215, allows the user to request the printing of a summary level report of all electronic cash letters sent out for a specific day, along with a the corresponding expected benefits report 217. A second utility allows the user to delete an entire entry from a previous extract file.

Referring now to FIG. 3, the Enhanced Send segment of the Send portion of the Electronic Check Presentment System extends the functionality of the Basic Send segment to include the capability of extracting at the cash letter bundle level and ensures that the paper cash letter 113A, 113B and the ECP transmit file 213 are exact duplicates of one another. The Enhanced Send segment includes modules and files that are functionally similar to those of the basic send system: CIF file 205; CPCS Mass Data Set file 203; extract control file 207; intermediate extract file 209; formatter 211; and ECP transmit file 213.

An enhanced send extract module 301 allows a user to select a specific bank and a specific cash letter time and extract all captured transactions for this cash letter. The enhanced send extract module 301 functions similarly to the one in the Basic Send segment 201 except that, after the user has selected a bank's records to be extracted, prompts are initiated to enter the cash letter time that identifies the kill bundles to be extracted. The module then reads the CPCS captured bundle file 303 to select records that matches the requested cash letter time. The selected records provide pointers into the CPCS mass data set 203, that are used to extract all transaction records for the corresponding captured bundle. The module then creates an intermediate extract file 209, that is processed through the formatter 211 module as in the Basic Send segment 201.

The Enhanced Send segment includes a utility that allows the user to generate an end of day benefits summary report 217 through the end of day reporting module 215 that is a summary level report of all electronic cash letters sent out for a specific day along with the corresponding expected benefit amounts. This utility initiates prompts to enter the requested cycle for the report then extracts the data for the requested cycle and formats the information for printing.

The Receive System

Referring to FIGS. 4A-9, a Receive system verifies, processes and monitors the receipt of electronic cash letters from partner banks. It handles the automated entry of non-MICR data into CPCS and the follow-up reconciliation of the electronically captured transactions to the actual physical paper transactions. The Receive system comprises five modules: an input file preprocessor; a CPCS non-MICR input processing module; a reconciliation module, a code line match/directed fine sort module; and an end-of-day reporting module.

Figure 4A:
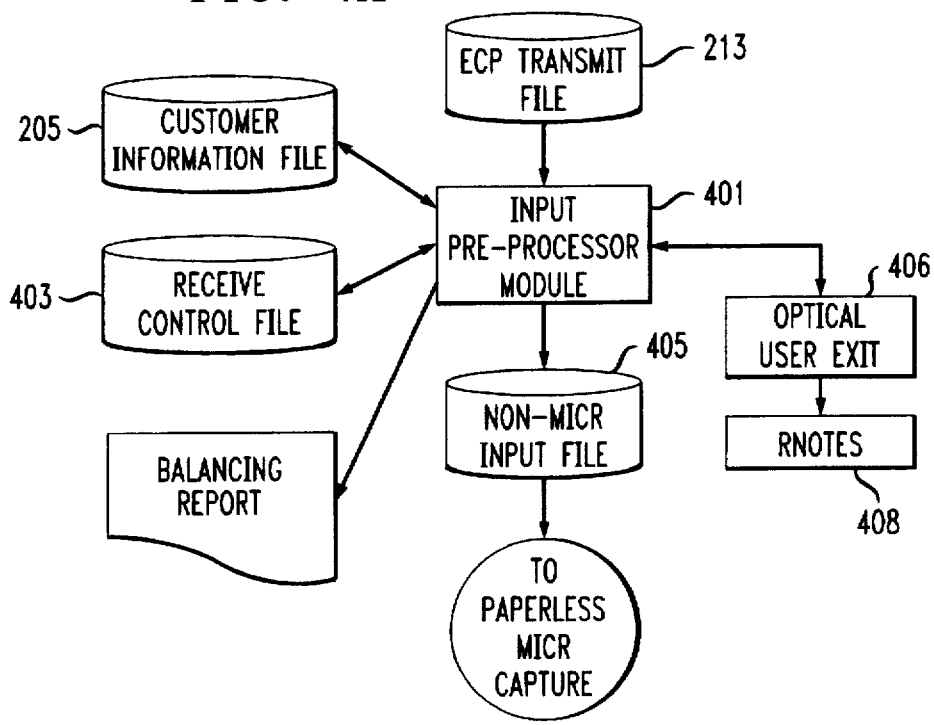
FIG. 4A is a schematic block representation, in flow chart form, of a preprocessor module for operation in a receive subsystem of the electronic check presentment system.

Referring now to FIG. 4A, the input pre-processor 401 is a batch process that is either manually started or auto-started from the transmission receive job. Its function is to validate, balance and pre-edit an incoming ECP transmit file 213 from other partner banks. The input pre-processor 401 reads the presenting bank's transit/routing number contained in the file header record of the electronic cash letter file and validates this number against the transit/routing numbers contained in the receiving bank's customer information file ("CIF") 205. The validation determines whether the sending bank is a valid sending partner and whether an exchange agreement between the two is currently in force. If the sending bank is validated in both of these respects, the input preprocessor module 401 continues to process the electronic cash letter file.

Control records are created by the input pre-processor module 401 to ensure that the file contents are appropriate for further processing and to protect against duplicate file receipts, each record in the ECP transmit file 213 is examined for validity and is reformatted in a form acceptable to the non-MICR input file 405. It is during this examination phase that, in accordance with the RNOTEs portion of the system, each record is examined by the ECP input pre-processor module 401 to determine the contents of the selected disposition code. Further, at this point, the disposition code may be modified to conform to the payor bank's processing requirements by appending a different code to the individual record or by incorporating a transaction code to denote the disposition requirements or by other means. Whatever method is chosen, the disposition code is available for examination and processing in subsequent processing functions. Upon receipt and validation of each electronic cash letter file, a record for each file is created in a receive control file 403. The record comprises data associated with the electronic cash letter file such as the name of the file, the date and time the file was created, the total number of entries in the file and other information pertaining to file, bundle and cash letter totals. This information is updated as pre-processing of the ECP transmit file 213 continues.

The ECP transmit file 213 is then checked for duplicates at the file level, the cash letter level and the bundle level by searching the records in the receive control file 403 for matching creation dates and times, matching cash letter numbers and matching kill bundle identification codes and kill bundle numbers. If any duplicate cash letters exist, they are bypassed during processing. After checking for duplication, the input pre-processor module 401 balances the electronic cash letter file at the bundle level, the cash letter level and the file level. For balancing at the bundle level, the total number of all check records in the batch are balanced against the check record count extracted from the batch trailer. The total dollar amounts of all check records and all eligible benefit sharing check records in the batch are also balanced against the check record count extracted from the batch trailer.

The file is balanced at the cash letter level by comparing the total number of batch check records and the total dollar amount of all eligible benefit sharing records, that are extracted from the cash letter trailer with those amounts calculated by the input preprocessor module 401 upon examination of the individual check images. The input pre-processor module 401 balances the electronic cash letter file at the file level by comparing the total dollar amount of all cash letters and the total number of cash letters in the file with the associated information contained in the file trailer. The input pre-processor module 401 then prints a balancing report that lists, by cash letter, all out-of-balance batches, cash letters or files.

The input pre-processor module 401 then reformats the incoming file into a CPCS MICR format file termed a "non-MICR" input file 405 to differentiate it from a MICR file that is created from the capturing of paper checks. This non-MICR file 405 includes fields that specify post/no-post codes that were assigned to specific checks during pre-process logic and through the optional user exit 406. In accordance with the RNOTEs portion of the system, the optional user exits 406 may also be used to extract a file of RNOTEs 408, both preliminary and final, that have been sent by the payor bank in accordance with an RNOTE eligibility flag setting that was previously incorporated within the ECP record.

Figure 4B:
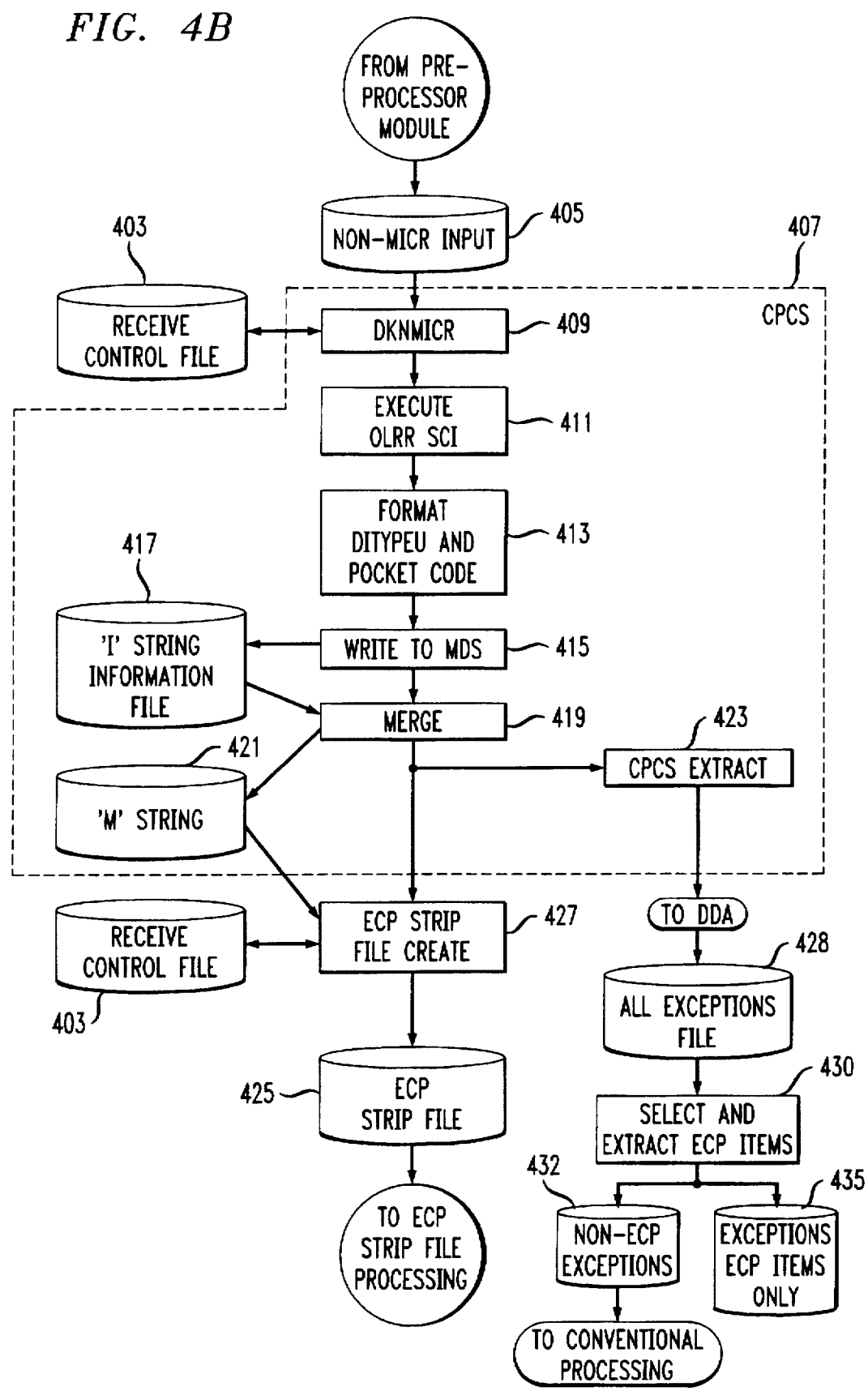
FIG. 4B is a schematic block representation illustrating the paperless MICR capture operation in the receive subsystem that allows the CPCS or IPS to process electronically received transactions as if they were physical paper and further illustrating the processing required to prepare the files for entry into a conventional DDA system within an electronic presentment system.

Referring now to FIG. 4B, after pre-processing, the non-MICR input file 405 is provided to the CPCS for a process termed paperless MICR capture, a process required to prepare files for entry into the DDA system that also generates exceptions relating to unpostable ECP transactions. This process uses the reformatted electronic records to perform the identical functions that are performed as if they were received as paper cash letters. These functions are well known to those of ordinary skill in the art. To perform this process, a preexisting CPCS system is modified so that it is "tricked" into thinking that the transactions presented from the non-MICR input file 405 are paper transactions. The CPCS captures and processes electronic cash letter as if they were normal paper cash letters and all captured electronic transactions are assigned a second ISN by the CPCS.

Illustrated are standard CPCS 407 modules, each of which has processes well known in the art. Very briefly, the DKNMICR module 409 includes all of the modules for interfacing with sorters for MICR capture and sorting. An OLRR SCI module 411 "edits" or checks the MICR line for each transaction provided by the DKNMICR modules for validity (e.g., the transit/routing number and account number). The format DIFYPEU and pocket code module 413 formats the MICR data for the transaction and assigns the transaction a pocket code for DDA or other posting system processing. This MICR data and the pocket code are written to an "all-transactions" I-string information file 417, that is a mass data storage ("MDS") file, in step 415. At merge step 419, the I-string information file 417 is converted to an M-string data file 421 by, in essence, stripping all control documents from the file. The CPCS extract module 423 then extracts the data necessary for posting to DDA or other posting systems.

For processing with the non-MICR input file, only the DKNMICR module 409 of the CPCS must be substantially modified. One modification allows a station control block to be defined for an electronic cash letter sorter. The function indicates that an electronic cash letter sorter has been defined so that the CPCS system can generate the necessary control blocks for the electronic cash letter. Another modification adds references to the electronic cash letter extensions for the station control block and the MICR control table. The CPCS program is also modified to look for a run started on an electronic cash letter sorter. Upon detection, it passes control to the new electronic cash letter initialization module that loads the OLRR SCI module 411 edits and retrieves a tracer number from the receive control file 403. When the electronic cash letter sorter run has been initialized, MICR task processing continues as if processing a normal paper run. The receive control file 403 is updated with balance summaries of the transactions processed from the electronic cash letter during the run by the DKNMICR modules 409 for cash letter balance control.

Upon completion of the CPCS non-MICR processing run, an ECP strip file 425 is created by an ECP strip file create module 427. This module creates a file of the non-MICR input transactions in I-string sequence and DIIMAGE format. The strip file creation module also creates a balance summary of the transactions entered in the ECP strip file 425 for error checking against the summary in the receive control file 403. A further result of the capture function is a validated DDA transaction data base 423 that is available to enter the normal non-MICR extract module that prepares a file of valid DDA transactions for entering the bank's regular DDA system. The disposition code used in the RNOTEs portion of the present systems may be passed through this process and is, therefore, available on this DDA transactions file for examination by the DDA system.

Banks use many types of DDA systems, but, in general, all such systems use some form of DDA master file that contains each of the account balances, static data and historical data, as well as transaction histories. These DDA master files are matched to the combination of ECP DDA transactions and those generated by and received from non-ECP DDA transactions. During the DDA process, each individual account is examined and the ECP transactions and non-ECP transactions are applied. If the DDA process determines that an accounting exception is to occur, the process creates a DDA all exceptions file 428. This exceptions file contains information as to the specific transaction that caused the exception and the type of exception. A select and extract ECP transactions process 430 then divides the all exceptions file 428 into a non-ECP exceptions file 432 and an ECP exceptions file 435. The contents of the non-ECP DDA exceptions file 432 typically comprises the paper ISN, exception reason, amount, account number. The non-ECP exceptions 432 are then forwarded for conventional processing. Exception listings are produced for further research and review by bank officers to determine disposition. The RNOTEs system allows the disposition selected by the original depositor bank to be made available to the process of determining the disposition by the payor bank and thereby automates the process of notification back to the original depositor bank.

Figure 4C:
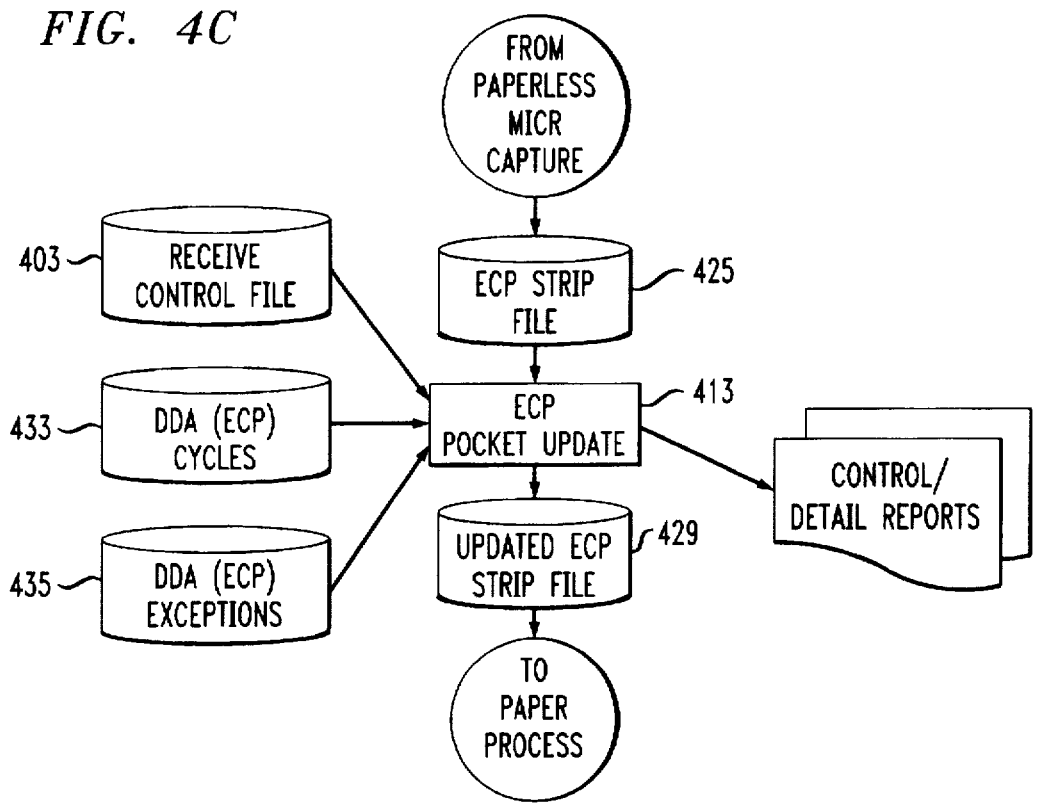
FIG. 4C is a schematic block representation of an ECP strip file warehouse process in a receive sub-system.

Referring now to FIG. 4C, on the next day (day 2), the ECP strip file 425 must be updated with information about whether there were ECP checks processed in the DDA the night before and not posted (exception checks), as well as the proper statement cycle information for each transaction that was posted. To create an updated ECP strip file 429, an ECP pocket update module 413 in the ECP system matches each transaction in the ECP strip file 425 with the corresponding DDA cycle for the transaction in the DDA ("ECP") cycles file 433 and with any exceptions for the transaction in the ECP exceptions file 435.

Figure 4D:
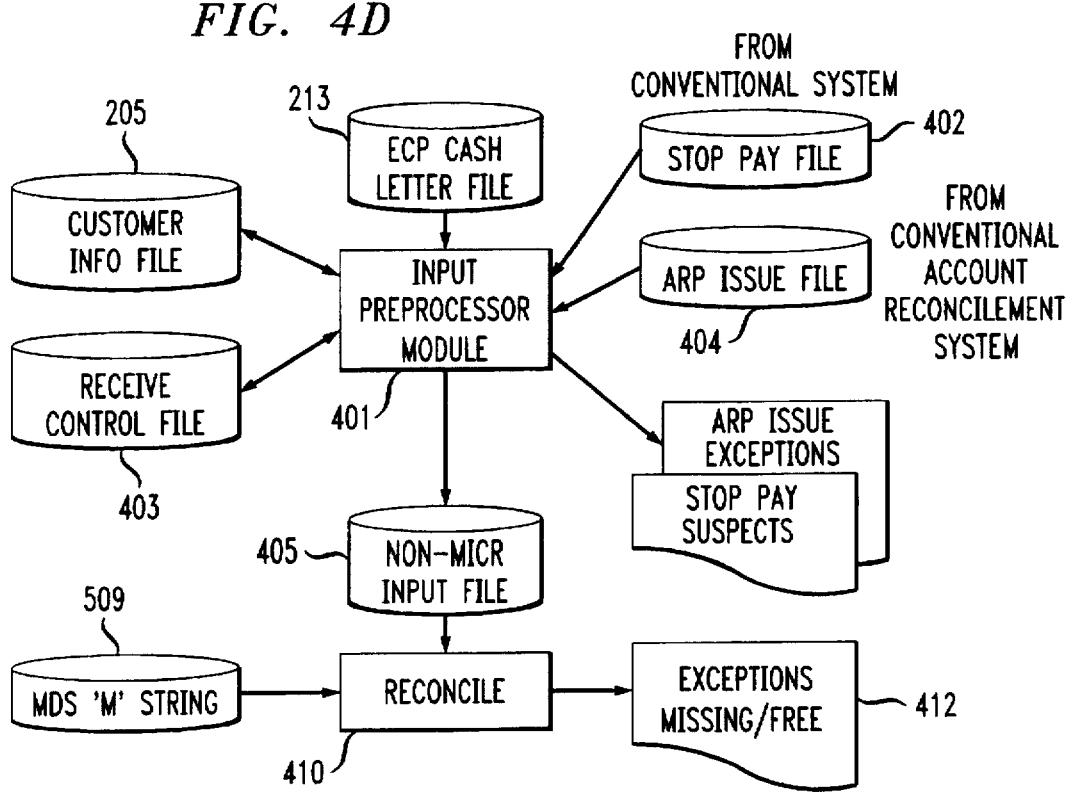
FIG. 4D is a schematic block representation of the paperless MICR capture operation of FIG. 4B, including reconciliation between the electronic file and the corresponding captured paper file.

Turning now to FIG. 4D, shown is the schematic block diagram of FIG. 4A showing, in particular, reconcilement between the electronic file and the corresponding captured paper file. Again, the input pre-processor module 401 is a batch process that is either manually started or auto-started by the ECP transmit file 213. Its function is to validate, balance and pre-edit an incoming ECP transmit file 213 from other partner banks. The input pre-processor module 401 reads the presenting bank's transit/routing number contained in the file header record of the electronic cash letter file and validates this number against the transit/routing numbers contained in the receiving bank's CIF 205. The validation determines whether the sending bank is a valid sending partner and whether an exchange agreement between the two is currently in force. If the sending bank is validated in both of these respects, the pre-processor continues to process the electronic cash letter file. The input pre-processor module 401 also reads an optional stop pay file 407 and an optional ARp issue file 404. The stop pay file 407 and ARP issue file 404 are generated within conventional stop pay and ARP systems (not shown).

Control records are created by the input pre-processor module 401 to ensure that the file contents are appropriate for further processing and to protect against duplicate file receipts. Each record in the ECP transmit file 213 is examined for validity and is reformatted in a form acceptable to the non-MICR input file 405. It is during this examination phase that, in accordance with the RNOTEs portion of the system, each record is examined by the input pre-processor program 401 to determine the contents and meaning of the selected disposition code. Further, at this point, the disposition code may be modified to conform to the payor bank's processing requirements by appending a different code to the individual record or by incorporating a transaction code to denote the disposition requirements or by other means. Whatever method is chosen, the disposition code is available for examination and processing in subsequent processing functions. Upon receipt and validation of each electronic cash letter file, a record for each file is created in a receive control file 403. The record comprises data associated with the electronic cash letter file such as the name of the file, the date and time the file was created, the total number of entries in the file, the beginning and ending ISNs and other information pertaining to file, bundle and cash letter totals. This information is updated as pre-processing of the ECP transmit file 213 continues.

The input pre-processor module 401 further produces issue exceptions and stop pay suspect reports 409 during its operation. The content and function of these reports have been previously discussed. These reports then allow the payor bank to detect potential fraud conditions at an earlier time in the processing cycle.

The input pre-processor module 401 then reformats the incoming file into a CPCS MICR format file termed a "non-MICR" input file 405 to differentiate it from a MICR file that is created from the capturing of paper checks. The non-MICR input file 405 includes fields that specify post/ no-post codes that were assigned to specific checks during pre-process logic and through the optional user exit 406 of FIG. 4A. In FIG. 4D, the non-MICR input file 405 is matched with the paper capture file, the MDS 'M' string file 509 to perform a reconciliation function 410. The MDS 'M' string file 509 masks certain fields or portions of fields in the non-MICR input file 405 to produce an exceptions missing/ free report 411. This report contains a list of physical checks for which there are no corresponding records in the electronic file ("free") and electronic records for which there are no corresponding physical checks ("missing"). With control totals and exceptions identified, the task of reconciling physical checks to the cash letter becomes much easier.

Figure 5:
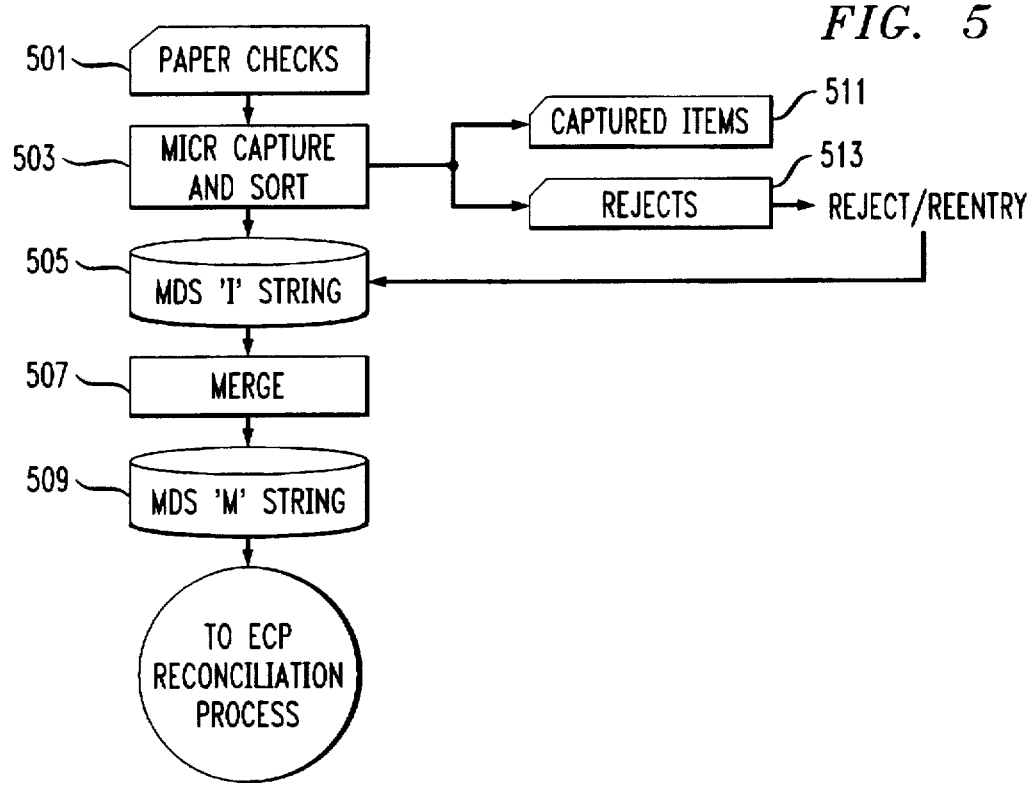
FIG. 5 is a schematic block representation of a first paper capture and sorting in the receive sub-system.

Referring now to FIG. 5, there is illustrated the process of the paper capture of cash letters. After the paper cash letter is received by the payor bank, it is validated and sorted using high speed reader/sorter equipment in a conventional manner, without modification, by the CPCS in what is termed the first paper sort. Paper checks 501 are prepared by the block building clerk and read through the MICR capture and sort system 503. The capture of the paper cash letter produces a paper capture data file or MDS I-string file 505, that is then merged at step 507 into an MDS M-string file 509 that is used as an input into the ECP reconciliation module 410. Physical captured transactions 511 are gathered, as they are used, in a second paper pass (see FIG. 7). Physical transactions that are rejects 513 in the MICR capture and sort 503 are reentered manually into the MDS I-string file 505. All captured paper transactions are assigned a third ISN by the CPCS.

Figure 6:
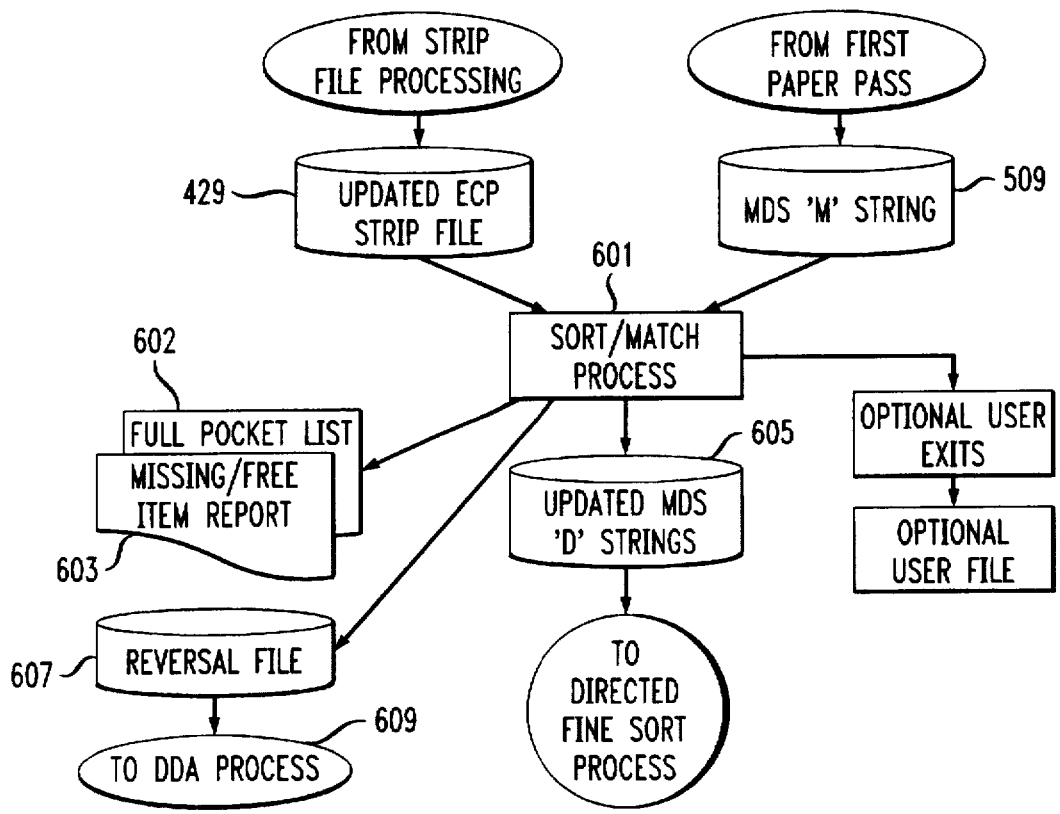
FIG. 6 is a schematic block representation of an ECP reconcilement process within the electronic check presentment system.

Referring now to FIG. 6, there is illustrated therein the ECP process of matching and reconciling the ECP cash letter transmission file to the paper capture file after completion of the DDA process. After the first paper pass, the file created of paper transactions are reconciled with the electronic file of transactions received the previous day by electronically matching the two data files in the sort/match process module 601. The purpose of this match is to determine if there were any ECP transactions that were not present on the paper capture data file 509 and if there were any paper transactions that were not present on the updated ECP strip file 429. If the former were true, reversal transactions would be created and stored in a reversal file 607 to offset the unmatched ECP transaction at the next DDA processing cycle. If the latter condition were true, the physical paper transaction would be selected to be reentered according to the standard check capture method. (See FIG. 7.)

The sort/match module sorts through the updated ECP strip file 429 in order to compare the records on the updated ECP strip file 429 with the like records on the MDS M-string file 509 and merge the pocket codes from the strip file into the M-string file 509 to produce an updated MDS D-strings file 605. It then produces a complete pocket list ("P-List") report 602 in account number and ISN order and additionally produces a missing free transaction report 603. A missing/free transaction report 603 details any missing paper transactions for which there was an electronic transaction (missing) and any paper checks for which there is not a corresponding electronic check (free).

Figure 7:
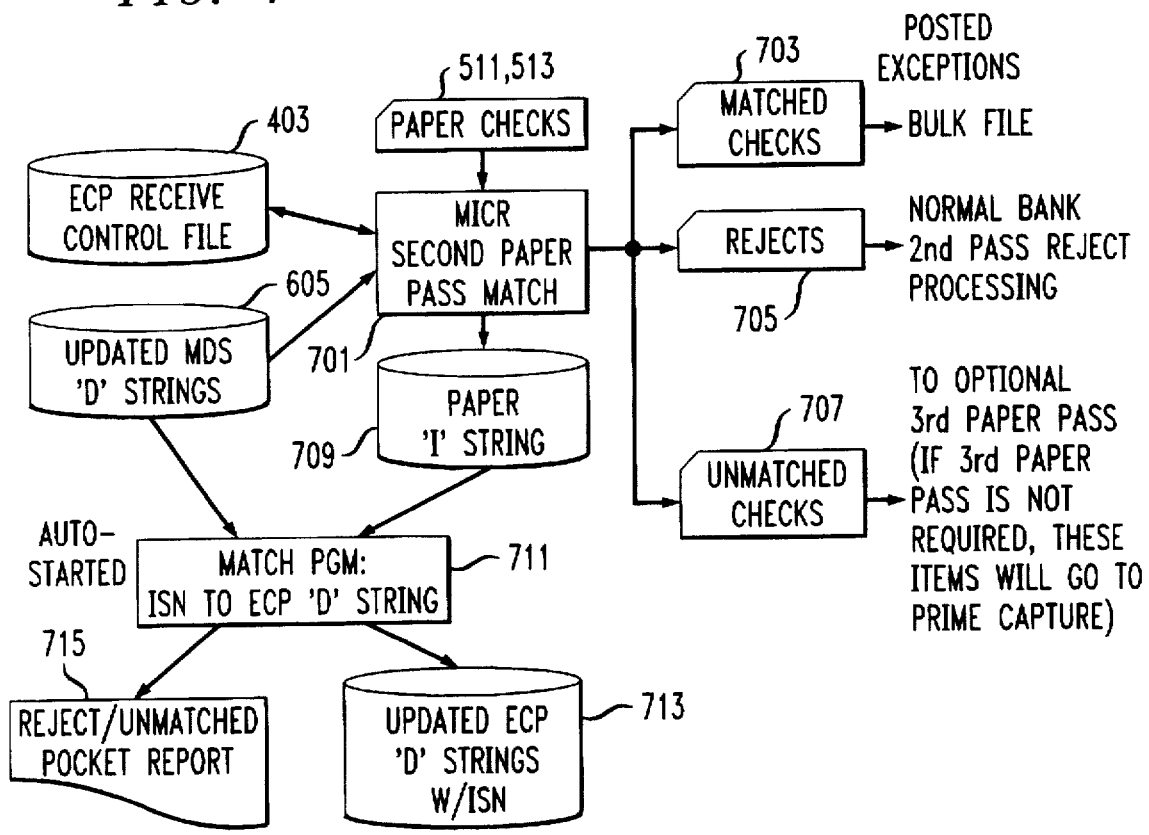
FIG. 7 is a block schematic representation of a second paper pass directed fine sort operation of the receive sub-system.

Referring now to FIG. 7, the captured paper checks 511 and the reject paper checks 513 are once again passed through the high speed reader/sorter (not shown) for pocketing the paper transactions. This directed fine sort or MICR-second paper pass match module 701 matches the MICR code line of the electronic transaction in the updated MDS 'D'-strings file 605 with the actual paper check as it is re-read by the high speed reader/sorter (not shown) and directs the paper transaction to the appropriate pocket as dictated by the pocket code in the updated MDS 'D'-strings file 605, as is further described below. The MICR second paper pass match 701 assumes that a pocket code is present for each transaction in the updated MDS 'D'-strings file 605.

Thus, only paper checks for which the corresponding electronic cash letter images have completed DDA processing are able to be directed to a pocket by the directed fine sort; all other unmatched checks (free) are directed to an unmatched pocket 707. Additionally, to facilitate matching of the paper checks to the electronic checks, the updated MDS 'D'-strings file 605 is used, since these records are in the same sequence as the actual paper checks from the first paper pass.

The updated ECP D-strings file W/ISN 713 (containing the new pocket codes and both electronic and paper ISNs) directs the fine sort module, that in turn directs the reader/sorter (not shown), to place matched paper checks 703 to a predefined pocket. The matched posted checks are pocketed by statement cycle, the matched unposted exception checks or unmatched checks 707 are pocketed by exception code, the physical rejected checks 705 are sent to a reject pocket and the unmatched checks (free transactions) are sent to an unmatched pocket. All rejected checks 705 are fully reprocessed until only the actual unmatched checks (free transactions) remain. These checks are then batched and re-captured on the reader/sorter along with all of the bank's other first time capture work. The matched transactions are transferred to bulk file vaults or exception processing as appropriate.

The MICR-second paper match module 701 expects that the updated MDS 'D'-string file 605 is in the same sequence as the paper checks after the first paper pass. If the paper checks are accidently dropped or otherwise become out of sequence between the first and the second paper pass, an optional third paper pass 901 is then provided to read the paper checks in their current order, to re-order the MDS 'D'-string file 605 to match the paper sequence and then perform the directed fine sort (See FIG. 9).

Figure 8:
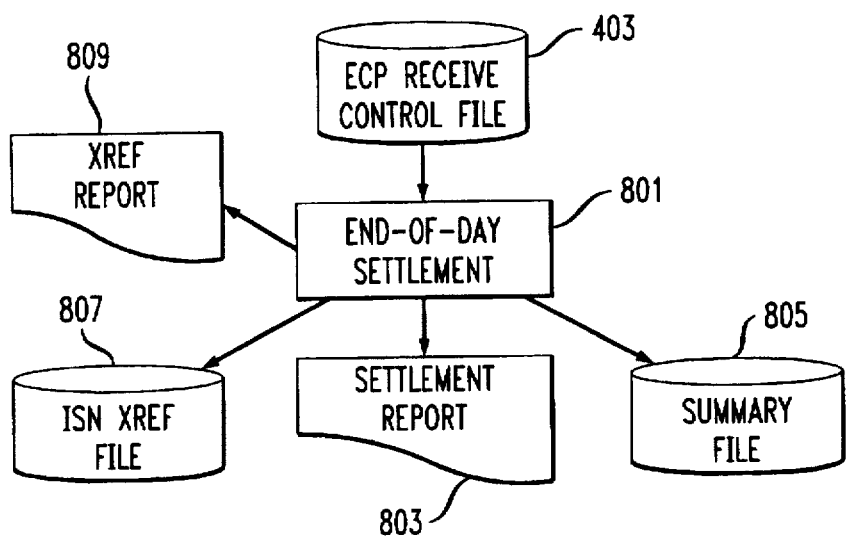
FIG. 8 is a block schematic representation of an end-of-day settlement function in the receive sub-system.

Referring now to FIG. 8, an end-of-day settlement module 801 reads the ECP receive control file 403 and produces an end of day or week or month settlement report 803 by bank, for all electronic cash letters received and processed through the electronic check presentment system. Additionally, an ISN cross-reference file and report 807 is produced, listing the three ISNs associated with each check: the sending bank ISN, the electronic ISN and the paper ISN. An transaction sequence cross-reference file is also produced to provide an interface to various other automated look-up and retrieval systems (not shown).

Figure 9:
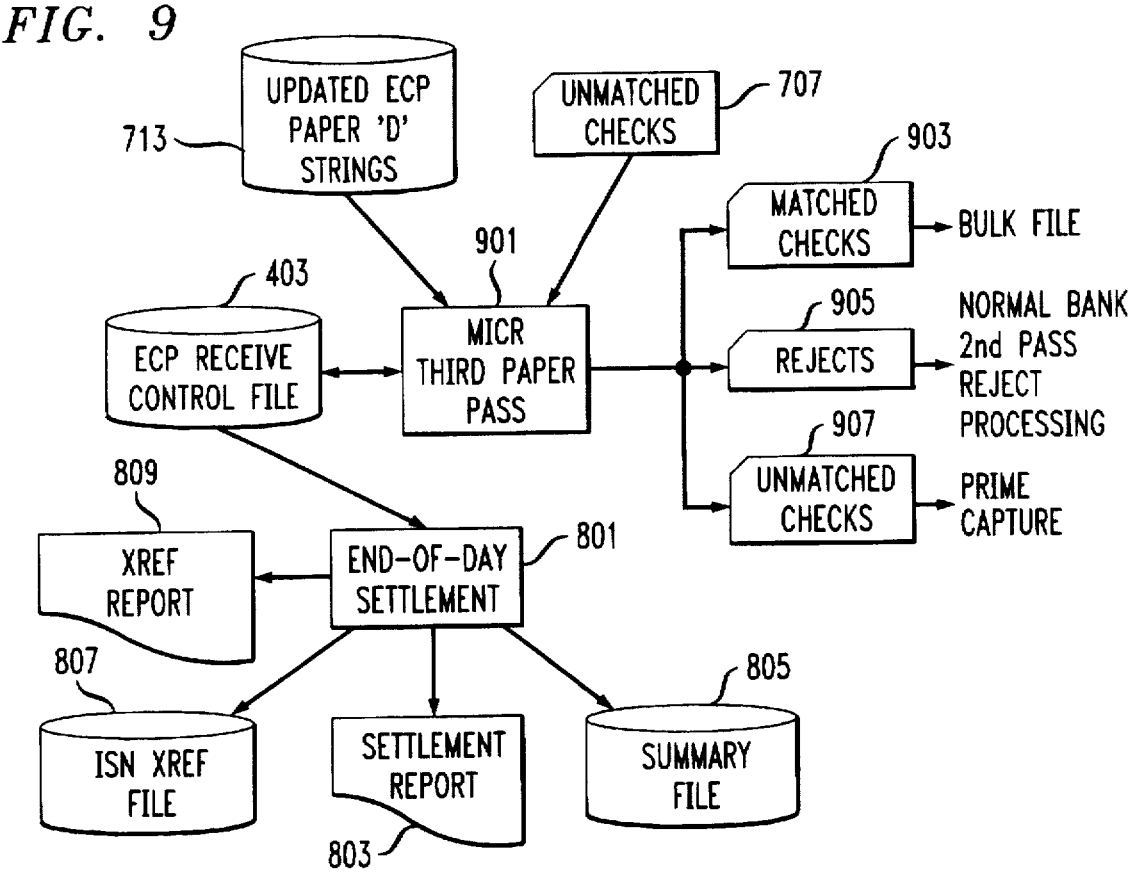
FIG. 9 is a block schematic representation of a third paper pass directed fine sort operation of the receive sub-system.

Referring now to FIG. 9, the unmatched checks (free) 707 are used as input to a MICR third paper pass 901, also known as a directed fine sort module. This module uses the high-speed reader/sorter to read, validate and pocket the checks that were unmatched during the process outlined in the discussion of FIG. 7 above. The checks are read and matched using the updated ECP 'D'-strings file W/ISN 713 having ISNs. If during the match process using the MICR line as compared to like data from the updated ECP D-strings with ISNs 713 a match is found, the check is directed to a pocket designated as a matched check pocket 903. If the check is unreadable, it is rejected to a specific reject pocket 905. The rejected checks are then repaired and re-entered through reject processing procedures. If the check is unable to be matched, it is directed to a specific pocket 907 and is labeled a free transaction. These free transaction checks are grouped for subsequent re-entry into a normal prime pass capture using CPCS. During this illustrated third paper pass 901, the ECP receive control file 403 is updated with the details of the results of the matching operation. This updated file is then entered into the end of day settlement process 801 previously described in connection with FIG. 8.

Figure 10:
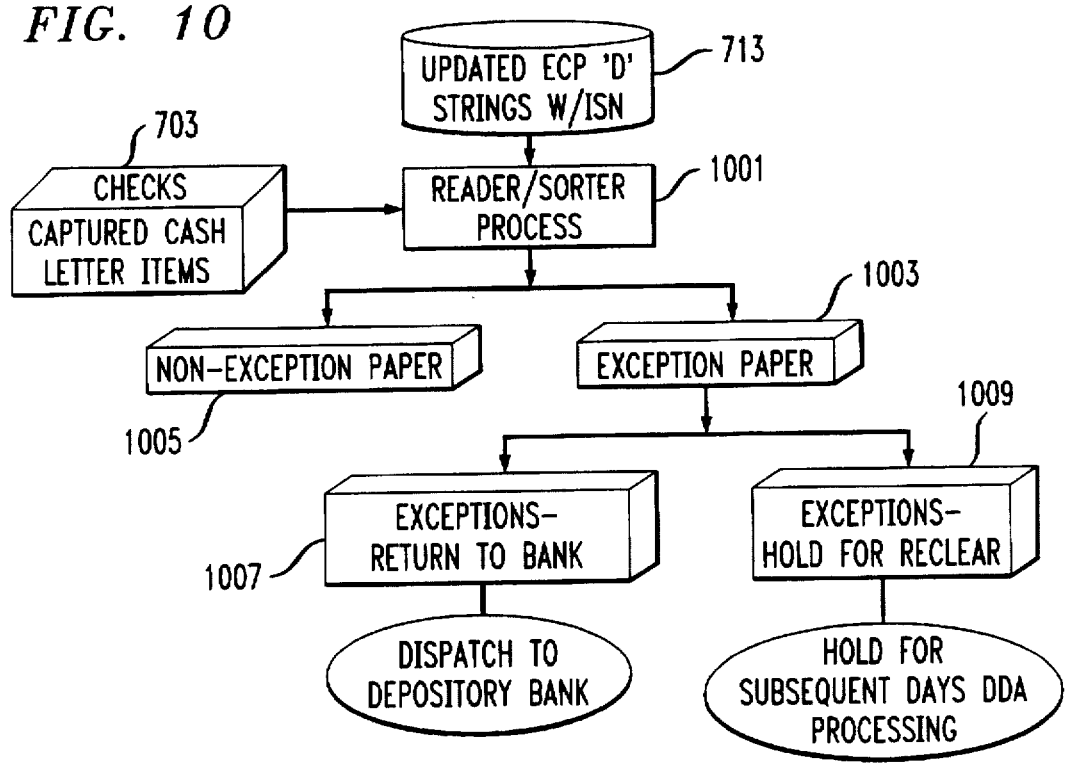
FIG. 10 is a flow chart depicting the process of an ECP-directed sort for segregating the checks within a cash letter into groupings by exception categories.

FIG. 10 illustrates in some detail the process of segregating the physical paper checks within a cash letter into groupings by exception categories through means of reprocessing the paper checks through the high speed reader/sorter process 1001. The updated ECP 'D'-strings file W/ISN 713 that was used in the process illustrated in FIG. 7 is again used during this process. The updated ECP 'D'-strings file 713 is used to select those paper transactions that have been identified as paper exceptions 1003 from those that are not exceptions 1005. The exceptions are further categorized by examination of the exception reason on the updated ECP 'D'-strings file W/ISN 713 into categories, for example: a paper transaction without a corresponding ECP transaction (free) or a paper transaction with a corresponding ECP transaction that is an exception 1003. The latter category is then further split into specific exception reason categories as defined by the exception reason code and the disposition code that was originally set by the bank. This process segregates the paper into exception transactions for return to bank 1007 in accordance with the RNOTEs portion of the system and paper transactions for subsequent reclear processing 1009. This determination is made as a result of existing partnership or cooperation agreements between a given pair of banks.

Return Notification System

The return transaction notification system provides banks participating in the electronic check presentment system with the ability to receive one or more early notifications of transactions previously presented that have been identified as exceptions by the payor bank so that the presenting bank may place a hold on the depositor's account pending final disposition of the potential return transaction. The return transaction notification system allows four general types of return notifications ("RNOTEs") to be generated for transactions originally presented as an ECP transaction: (1) a PRNOTE, generated as an exception transaction during the DDA process; (2) a Final Return Notification ("RNOTE"), generated as the result of the payor bank's pay/no pay decision process; and (3) a Confirmation Notice ("CRNOTE") that the specific check has been paid and (4) a Return Notification ("RENOTE") that denotes that the exception transaction is eligible for reclear. A presenting bank may thereafter provide the capability for RNOTE receipt to their downstream correspondent banks or corporate customers.

Presenting banks can establish the eligibility flag setting on the ECP transaction in several ways depending on their capture systems sort pattern structure and timing of their capture process. Three primary options for setting the flag are outlined as follows. Option one comprises setting the eligibility flag during prime high speed capture through the use of tables or coding within the CPCS sort pattern. These tables or the coding can consist of specific transit/routing numbers or specific depositor's account numbers extracted, from the preceding credit document, including specific transaction codes contained on the credit document, control document identifiers, dollar amount levels or account number ranges.

Option two comprises setting the eligibility flag after prime capture but prior to transmission to the payor bank. Similarly to option one, the tables or parameters are contained in an external file that is matched to a file of extracted credits generated from the MDS during the CPCS merge process. The eligibility flag setting is appended to the applicable matching credits; the detail debit transactions are flagged with the appropriate code by comparison to the credits transactions' range of ISNS.

Option three employs the presenting bank's sort pattern to identify eligible transactions on the basis of indicators established within the sort pattern. It can be used to determine whether a downstream correspondent's work is eligible for RNOTE processing based on identification of control documents preceding the work or by a unique sort pattern identification. The presenting bank,s own proof of deposit ("POD") capture process work can employ the method outlined in option two above. This method minimizes the frequency of sort pattern changes required in option one, while providing downstream correspondents a flexible method of using the process.

Regardless of the method employed to determine the eligibility setting, the presenting bank sets the appropriate eligibility switch on the detail ECP record prior to transmission. The switch settings may be, for example:

Blank or N—Transaction not eligible for RNOTEs;
B—Preliminary RNOTEs and Final RNOTEs notices required; or
F—Final RNOTE notice required.

The receiving bank has the responsibility to examine the eligibility flag to determine if an RNOTE is to be generated in the event that the detail ECP record is identified as an exception transaction as a result of the DDA process.

Figure 11:
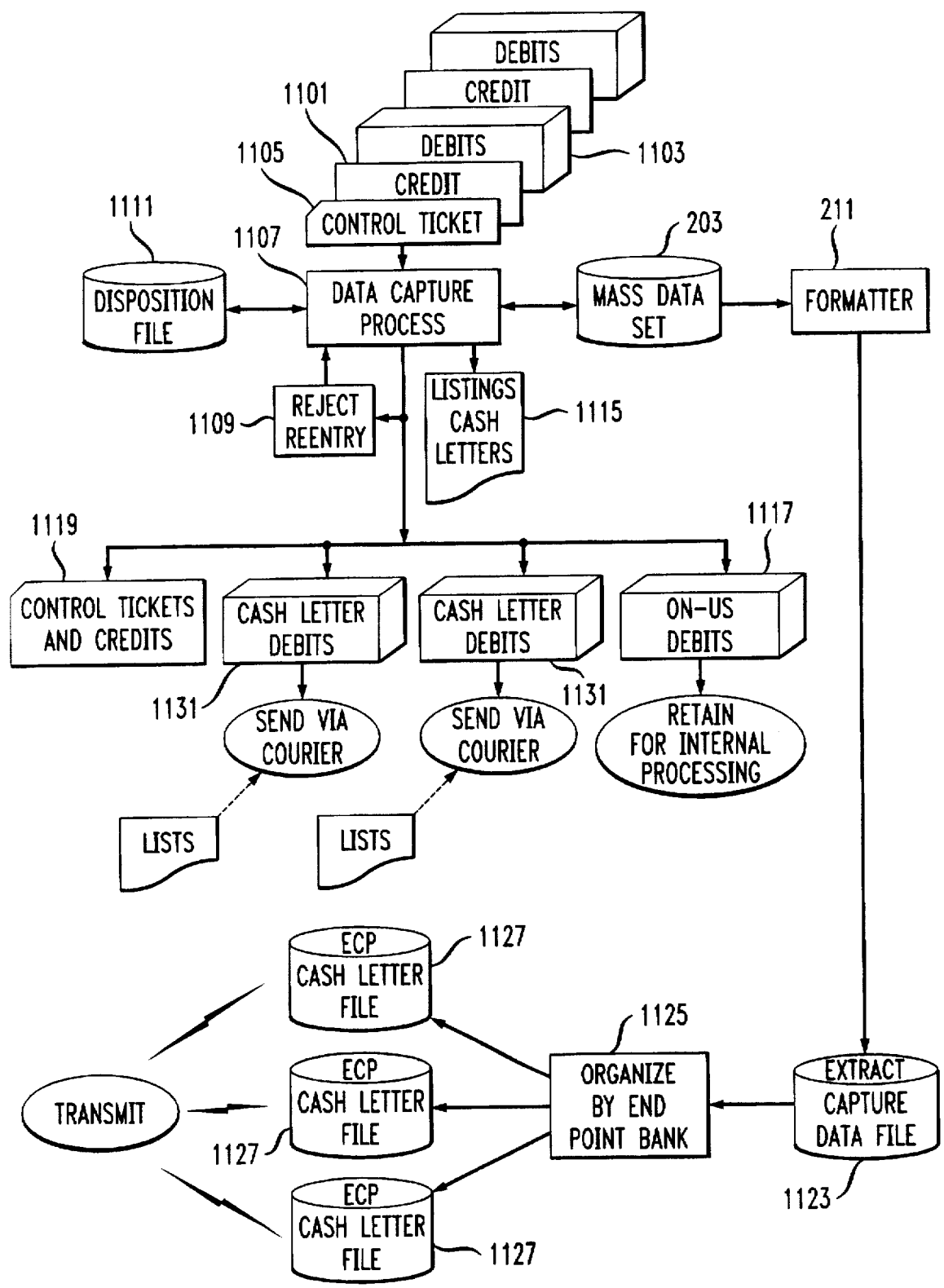
FIG. 11 is a schematic diagram, in flow chart form, showing a basic check presentment and processing system using an electronic check presentment system.

Having described an overview of the electronic check presentment portion of the system, the Return Notification ("RNOTEs") portion of the system will now be described within the overall context of the ECP System. FIG. 11 illustrates the ECP system as it may be used by a depository bank. The processes illustrated therein include the gathering of financial transactions and their entry into a conventional check processing system, as well as the generation of ECP cash letter files that are subsequently prepared for transmission to a payor bank.

Referring to FIG. 11, it can be seen that batches of entries in the form of credits (deposit tickets) 1101 and debits (checks) 1103 are received from various points of acceptance that might include a bank's proof department, clearing houses, lockboxes and the like. These batches comprise deposit sets having the credits 1101 preceding the associated debits 1103 for each deposit. Ordinarily, a number of batches are combined together to form a block. The block is preceded by a control ticket 1105 that contains the total dollar amount of the checks comprising the block. The blocks are then prepared for data capture.

During the data capture process 1107, the blocked batches of credits 1101 and their associated debits 1103 are processed through high speed reader/sorter devices such as an IBM 3890 or a Unisys DP1800 to read, validate, microfilm and extract the encoded information contained on each document. The physical documents are then directed to pockets on the reader/sorter in order to distribute the check documents to their applicable payor bank as determined by the transit/routing number contained in the MICR line on each check. Conventional check capture systems such as the IBM CPCS or the Unisys IPS perform the data capture function. Documents that do not pass validation rules are rejected during the data capture process 1107 and are repaired and reintroduced into the process through reject reentry means 1109.

During the data capture process 1107, each credit document 1101 is further examined to determine the selected disposition of the checks or debits 1103 that follow if a subsequent process at the payor bank determines that a check is to be returned unpaid. The examination comprises reading and extracting the credit account number of the credit document and using the account number to match the same account number in the disposition file 1111. Alternatively, the contents of other data within the document MICR line can be examined to determine the selected disposition, thereby eliminating the need for the disposition file 1111. Using either method, the checks 1103 following in the transaction set are appended with the contents of the selected disposition code and the selected preliminary or final RNOTE eligibility flag, along with the contents of the full MICR code line and this data is written to the mass data set file 203. Listings 1115 of each credit 1101 and debit 1103 within the block are prepared for control accounting and cash letter purposes and to provide cash letters 1115 that are associated with the physical checks 1103. The checks 1103 are then dispatched in the form of a cash letter, with their listings, to the designated payor bank, clearinghouse or Federal Reserve Bank. On-us debits 1117, control tickets and credits 1119 are retained by the bank performing the capture and sorting operations and are used for subsequent processing (not shown).

The data capture process 1107 performs the extract formatter function 211 from the mass data set 203 created during the capture process. The extract, at this point, contains the details of each captured check —along with the applicable disposition code and eligibility flag —through subsequent processing means, the ECP transmit file 213 is sorted to organize the file by endpoint bank according to the formatter 211; after which separate ECP cash letter files 1127 are created that enter the ECP cash letter network where the files are transmitted to each of the endpoint banks in the form of electronic cash letters. The mass data set 203 is used by the send extract module 201 or, alternatively, the enhanced send extract module 301 to extract the ECP records that contain the details of each captured check along with the selected disposition code and eligibility flag. This extract and send process is illustrated in FIG. 2 when using the ECP send extract module 201 or in FIG. 3 when using the enhanced send extract module 301.

According to the system, as the POD process is performed, credit transactions are electronically read and validated. The depositor's account number is determined and the specific coded instructions as to the disposition of any potential returned checks following the credit is extracted from the credit itself or from an associated disposition data base. The coded instruction is temporarily stored and as the checks that follow that comprise the deposit are read and validated, the applicable instruction is appended to each of the check records for that deposit. The ECP check records are then created. These records contain the depositor's coded instructions. Upon conclusion of the POD process, the ECP file is prepared for transmission to the appropriate payor bank.

The transmitted ECP file is received at the payor bank and is processed through the various ECP processes as previously described. During the conventional DDA process, each ECP check record's dollar amount is debited to the applicable payor's account. If the ECP check amount is unable to be debited because of an insufficient account balance or some other unprocessable exception condition, an exception record is created. The exception record then contains, through data processing transfer techniques, the coded instructions that were included in the original ECP record. As a result of this process and subsequent data processing means, use of the exception record allows extraction and action to be taken in accordance with those instructions. Such actions may entail immediate notification by wire or telephone to the presenting bank of a high value return, retention of the physical exception check or the exception check file for resubmission on the following day, access to alternate lines of credit and the like. Each coded instruction has been predetermined by the payee as to the applicable method chosen for handling returned checks in the most expeditious manner.

Some possible examples of these coded instructions called the "disposition" instruction include:

| Code | Instruction |
|------|-------------|
| Blank | No return notification required |
| 1 | Wire/Fax notification if unpaid check is over $1,000.00 |
| 2 | Wire/Fax notification on all unpaid checks |
| 3 | Reclear if unpaid check is below $50.00 |
| 4 | Reclear if unpaid check is below $100.00 |
| 5 | Reclear all unpaid checks - hold at payor's bank |
| 6 | Provide notification if check has been paid |
| 7 | Provide multiple preliminary notifications |

The majority of large corporate depositors such as utility companies, mail order houses, credit card companies, grocery store chains, etc. deposit thousands of checks each day. In general, these corporate depositors have instructed their depository bank as to the standard method of processing a returned check. These types of instructions can be converted to the coding structure required by the disposition data base under the automated process. This process enables a corporate depositor to select a variety of alternatives depending on the content of the checks comprising the deposit.

As a result of this process, the payor bank is able to interpret the coded instructions and automate the processes required as dictated by the coded instructions and, in the majority of conditions, can avoid the physical handling and expense associated with reclearing checks. By instructing the payor bank as to the applicable method of handling a returned check, it is possible to advance the notification of return by at least one full processing day, to advance notification to the payee by at least two full days and to avoid the needless return of paper checks to be recleared, thus saving at least three full days. Through this advance electronic notification process it is possible to alert both the payee and the payee's bank of possible loss exposure through fraud or check kiting schemes so that early action can be taken to prevent a loss.

This advance electronic notification can also be used to advise the payee and the payee's bank that a deposited check has been paid, i.e., that no exception record was generated and, therefore, the payor's account was properly debited. This is particularly valuable information when checks are negotiated for collection purposes or when holds or stops have been placed on a specific check, pending its clearing at the payor's bank. As a result, releases of funds or merchandise, letters of credit or similar conveyances may be expedited by several days.

Although this invention is most beneficial to banks that receive and send ECP transactions, it is equally applicable for any bank's on-us deposited checks whereby the applicable disposition of a returned on-us check can be predetermined. For example, on-us transactions may be held for next day reclear or advance notification to the payee or the like. The usage of this technique for the bank's on-us deposited checks automates a large portion of the conventional return check process thereby saving manual processing functions and improving the notification process.

Figure 12A:
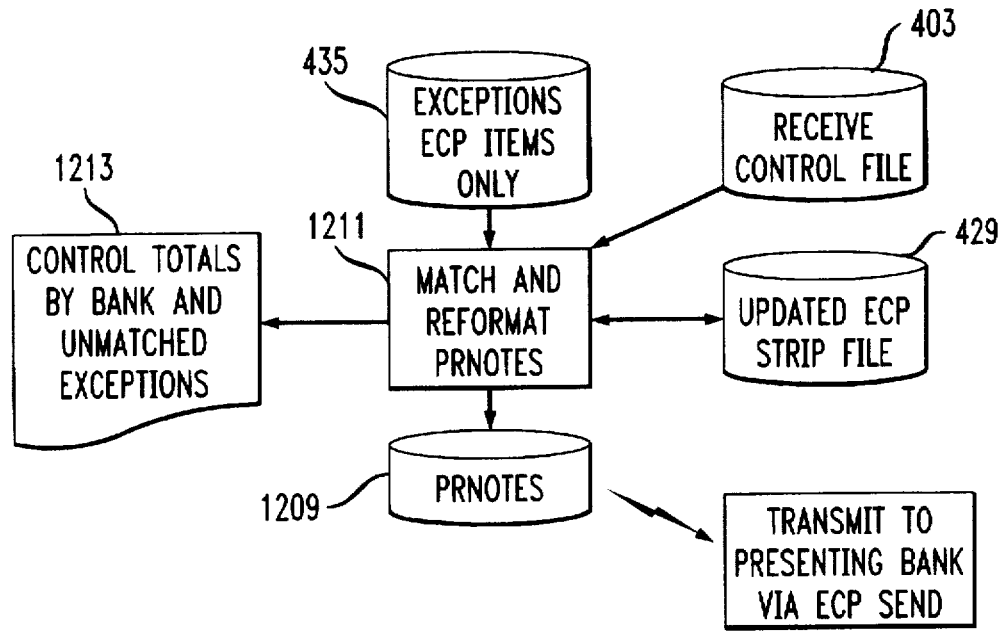
FIG. 12A is a graphical illustration of the receiving bank's generation of a PRNOTE.

FIG. 12A illustrates the generation of a PRNOTE by payor banks. The payor bank is responsible for the generation and transmission of the PRNOTE to the appropriate presenting bank. PRNOTEs are only applicable for transactions received via the ECP process that match an transaction on an exception file produced by the payor bank as a result of their DDA process as pointed out in FIG. 4B. It is possible for the disposition code to be set to allow PRNOTEs to be generated on more than one occasion prior to generation of final RNOTEs that follows a final pay/no pay decision that has been made by a payor bank.

At a minimum, the all exceptions file 428 must contain the following fields for each exception transaction: electronic or paper ISN number, exception reason code, amount, account short name (if available from the DDA file) and account number. The ECP exceptions file 435 contains exception data selected and extracted from the all exceptions file 428 shown in FIG. 4B, based upon the recognition of the unique electronic ISN. The updated ECP strip file 429, shown in FIG. 4C, created during the non-MICR capture process 407 and further updated during the ECP pocket update 431, is accessed by referring to the ECP sequence number of the exception record. Only those records that are identified as eligible for PRNOTEs as determined by the eligibility flag and the applicable return reason code are selected for generation of PRNOTEs during the match and reformat PRNOTEs program 1211. Exception reason codes for conditions related to invalid or unmatched account numbers are not selected.

As further illustrated in FIG. 12A, the receive control file 403 is accessed to determine the applicable presenting bank. This can also be determined by the electronic ISN ranges. Even if the ECP exceptions file 435 contains multiple records for the same electronic ISN, only one PRNOTE is created, using the first exception record encountered. If the exception record is unmatched on either file, a report 1213 is produced containing the data from the exception record. A report is also generated containing the number and amount of PRNOTEs generated for each presenting bank. The generated PRNOTE record in the PRNOTEs file 1209 contains the following fields: Record type-Code; PRNOTE indicator; Transit/Routing number (MICR line); Account number (MICR line); Amount (MICR line); Electronic ISN; Exception reason code; Sending bank ISN; Disposition code; and Account short name (if present from DDA file). Optional fields may include: Auxiliary On-Us (MICR line) and Process control number (MICR line). Applicable header and trailer records are generated to conform to the requirements of the ECP send sub-system. The PRNOTE file then enters the ECP send extract module 201 or the enhanced send extract module 301 for transmission to the original presenting bank.

Figure 12B:
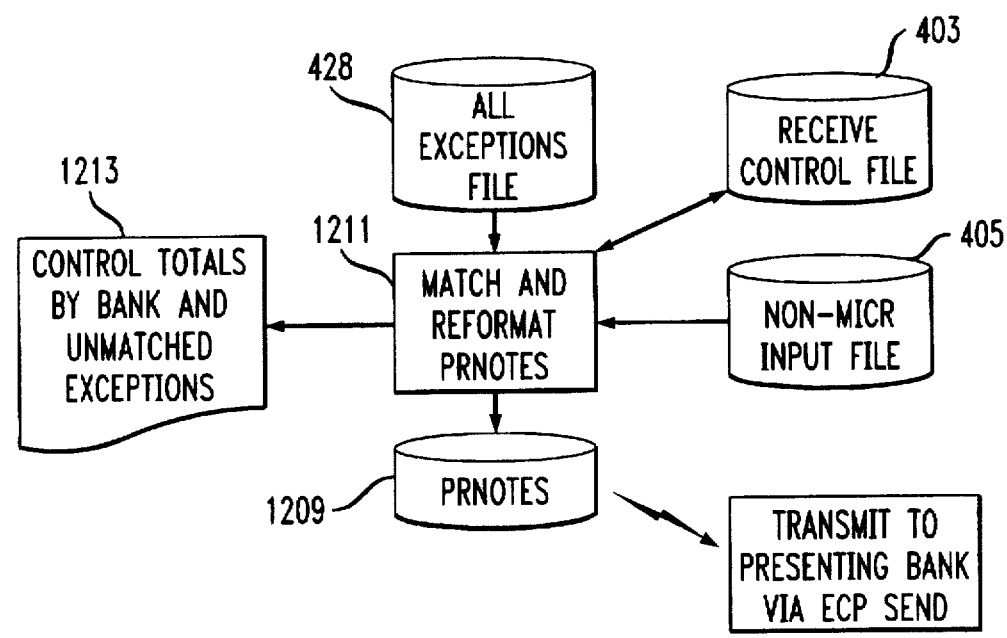
FIG. 12B is a schematic block representation of the exceptions notification system of the present invention.

Turning now to FIG. 12B, illustrated is a schematic block representation of the non-ECP exception notification system of the present invention. As discussed previously, the present invention enhances RNOTEs by providing advanced electronic notification of all DDA exceptions, whether they resulted from an ECP transaction or a paper check transaction. The present invention further provides a report containing control totals and unmatched exceptions to aid the reconciliation of physical checks to cash letters.

As shown in FIG. 12B, the all exceptions file 428 is matched to the Non-MICR input file 405 in a match and reformat PRNOTEs program 1211. In this process 1211, every exception taken from the all exceptions file 428 is matched against every record in the non-MICR input file 405 to determine the presenting bank transit/routing number. The receive control file 403 is used to determine the name and address of the presenting bank. The match and reformat PRNOTEs program 1211 produces a control total and unmatched exceptions report 1213 to aid in the reconcilement process.

Finally, the match and reformat PRNOTEs program 1211 produces the PRNOTEs file 1209 that is designed to be transmitted electronically back to respective presenting banks to notify them of exceptions and other anomalies found during the check posting process.

Figure 13:
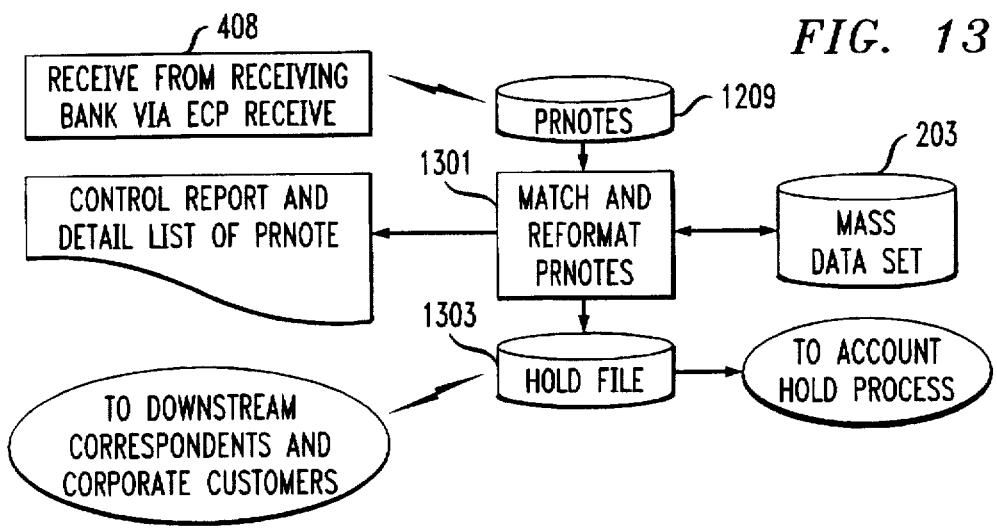
FIG. 13 is a graphical illustration of the presenting bank's generation of account holds based on the PRNOTE.

FIG. 13 illustrates the generation by presenting banks of account holds or other action based on PRNOTEs. The PRNOTEs file 1209 is received by the presenting bank through the ECP receive sub-system. The presenting bank must validate or match to their prior day's mass data set file 203 or other means to determine the depositor,s account number and must match and reformat PRNOTEs 1301 the PRNOTEs file 1209 for interface to their applicable "account hold" system, kite suspect system, memo post system or other such systems not illustrated in FIG. 13. Depending on the requirements of the presenting bank's customers, additional means are provided to extract data from the hold and notification file 1303 to transmit such data to corporate customers and correspondent banks. The PRNOTEs may be extracted from the transmit file using the user exit function of the pre-processor module 401 or from micro film retrieval or master lists, depending upon the volume of PRNOTEs received and the methods employed by the bank to retrieve the depositor's account number. The reformatted record contains the following fields: Record type-PRNOTE Indicator; Transit/Routing Number (MICR line); Account number (MICR line); Amount (MICR line); Electronic ISN; Exception reason code; Sending Bank ISN; Disposition code; Account short name (if present from the DDA file); Depositor's Transit/Routing Number; and Depositor's Account number. Optional fields include: Auxiliary On-Us (MICR line); Process Control (MICR line); Depositor's Auxiliary On-Us; Depositor's Process Control; Transaction Capture Sequence Number of the Associated Credit; and Presenting Bank's Transit/Routing Number.

Figure 14:
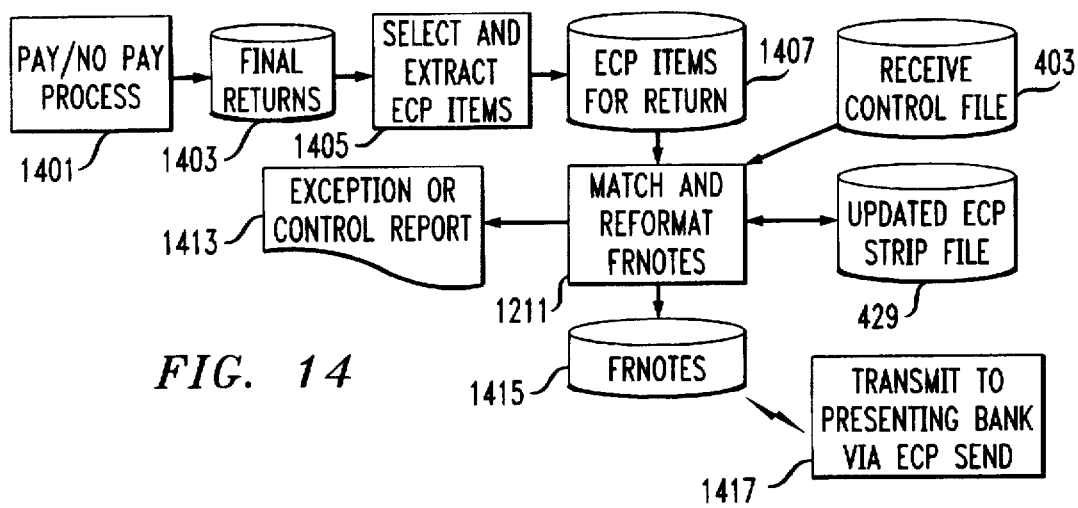
FIG. 14 is a graphical illustration of the receiving bank's generation of a final notification of return ("FRNOTE")

Referring next to FIG. 14, there is illustrated the generation of an FRNOTE by a receiving or payor bank. The receiving bank is responsible for generating and transmitting the FRNOTE to the appropriate presenting bank. FRNOTEs are only applicable for transactions received via the ECP process. FRNOTEs may be generated from records received as a result of the bank's pay/no pay process 1401 after the final disposition 1403 of a potential return is determined. It may be possible to generate a FRNOTE for an transaction that was not identified as a PRNOTE because of the many manual processes employed in making a return decision.

At a minimum, the pay/no pay process 1401 creates a record for each transaction to be returned to the presenting bank. The minimum content for the final return record contains the following fields: Electronic ISN; Exception reason code; Amount; and Account short name (if available on the pay/no pay file) and Account number. Only ECP transactions are selected and extracted 1405 from the final ECP transactions for inclusion in the ECP transactions for return file 1407, as determined from the unique electronic ISN. The updated ECP strip file 429 created during the non-MICR capture process is accessed by ECP sequence number of the transaction on the final transactions for return file 1407. All final returns are then matched 1211, regardless of the return reason code and an FRNOTEs file 1415 is generated and the FRNOTEs are transmitted 1417 to the appropriate presenting banks.

Referring further to FIG. 14, the receive control file 403 is accessed during the process to determine the applicable presenting bank. The determination is made on the basis of the range of ISNs related to the presenting bank. If the final return record is unmatched on either the updated ECP strip file 429 or the receive control file 403, an exception or control report 1413 is produced. This exception report 1413 contains the data from the unmatched FRNOTE record. Another report is also generated that contains the number and amount of FRNOTEs generated for each presenting bank. The FRNOTE record contains the following fields: Record type code indicator (FRNOTE); Transit/Routing Number (MICR line); Account number (MICR line); Amount (MICR Line); electronic ISN; Exception reason code; Sending Bank ISN; Disposition code; and Account short name (if available on the pay/no pay file). Optional fields include: Auxiliary on-us (MICR line); and Process control (MICR line). Applicable header and trailer records are generated to conform to the requirements of the ECP send sub-system.

Figure 15:
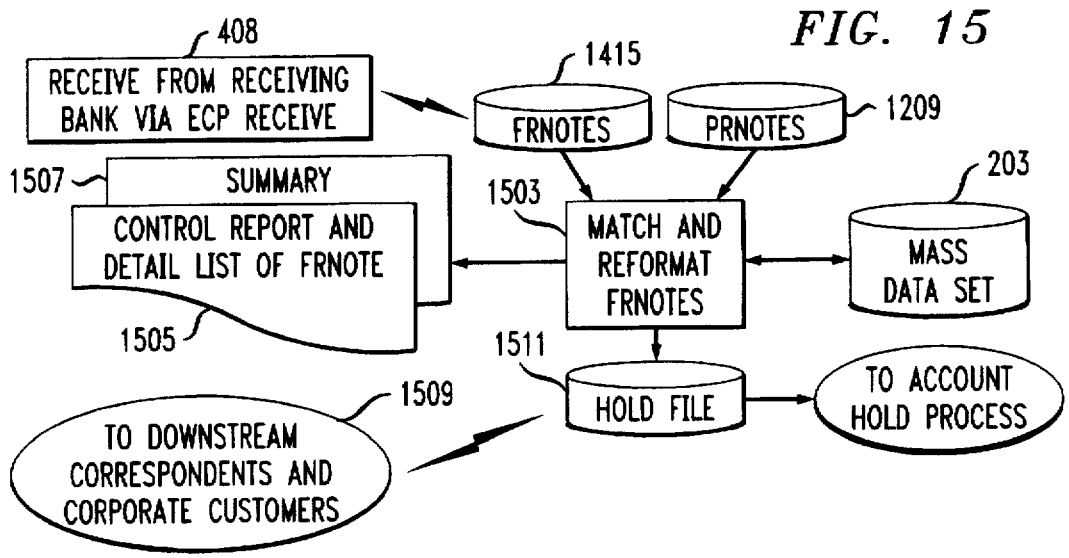
FIG. 15 is a graphical illustration of the presenting bank's generation of account holds based on the FRNOTE.

Referring next to FIG. 15, the generation by presenting banks of account holds based upon FRNOTEs is illustrated. The FRNOTEs file 1415 is received 1501 by the presenting bank through the ECP receive sub-system. The presenting bank must receive, validate or match and reformat 1503 the FRNOTEs file for the presenting bank's internal use in their applicable "account hold" system, kite suspect system, memo post system, return transaction system or other such system not illustrated in FIG. 15. The presenting bank must also produce control reports 1505, summary reports 1507 or other file transmissions or notification to their downstream correspondents and corporate customers 1509 via a hold file 1511 generated from the match and reformat process 1503.

The PRNOTEs file 1209 previously received and the FRNOTEs file 1415 are matched 1503 using the electronic ISN. Unmatched PRNOTE records that relate to preliminary returns that are no longer exceptions are dropped. Unmatched FRNOTEs, final returns that were not identified during the DDA exception process as exceptions, access the prior day's mass data set 203 or other means to obtain the applicable depositor account number based on the sending bank ISN. Matched PRNOTEs and FRNOTEs generate a reformatted record in the following format: Record type code; Final FRNOTE indicator; Transit/Routing number (MICR line); Account number (MICR line); Amount (MICR line); Electronic ISN; Exception reason code; Sending bank ISN; Disposition code; Account short name (if available from pay/no pay file); Depositor's transit/routing number; and depositor's account number. Optional fields include: Auxiliary on-us; Process control; Depositor's auxiliary on-us; Depositor's process control number; Transaction capture sequence number of the credit; Match code; and Presenting bank's transit/routing number.

A control report 1505 is prepared that lists the details of all unmatched FRNOTE records. A detailed listing 1505 is also produced that contains information on each FRNOTE. A summary report 1507 is produced by return reason and shows the number and amount of FRNOTEs grouped by those that matched a PRNOTE and those that were unmatched.

The above-described and illustrated return transaction notification system, when used in conjunction with an electronic check presentment or ECP system, provides a significant new capability to the banking industry. The return transaction notification system enhances the process of return of unpaid checks and provides, for the first time, for the advance notification of such return status. Moreover, the present invention reduces the risk of bank loss and bank loss exposure due to fraud, provides for the early detection of check kiting and effects a number of other economic benefits within the banking industry and among that industry's consumers through the reduction of manual handling operations.

The above-described system has been shown to provide an improved electronic check presentment system that allows all banks that use this system to electronically transfer and receive check information, reconcile this information against actual paper check processes and manage information associated with electronic check presentment such as cash letter, bundle and file totals, unmatched records/ paper and benefit sharing amounts. This system, as improved with the Return Transaction Notification System incorporated therein, further provides banks participating in the ECP system with the capability to receive an early notification of checks that it previously presented that have subsequently been identified by the payor bank as return checks, i.e., unpaid. This capability allows presenting banks the opportunity to protect against loss by placing a hold on the account of the party who deposited the check pending final disposition of the potential return check. The present invention also allows participating banks to append a selected disposition code at the time the check is initially processed that automatically instructs the payor bank's systems as to the method of handling a return check, without the need for time consuming manual processing of the check or additional discussion or coordination as to how the return check should be handled.

From the above, it is apparent that the present invention provides an improved ECP system having a non-ECP exceptions notification system incorporated therein and a method of electronically communicating data pertaining to non-ECP exceptions. The method, for use by a presenting bank and a payor bank having check presentment systems between which data related to checks may be electronically transmitted, comprises the steps of: (1) electronically transmitting, from the presenting bank to the payor bank, predetermined presentment information relating to the checks and permitting a determination by the payor bank as to which of the checks are properly payable by the payor bank, (2) comparing records of an exceptions file with records of a receive control file, the exceptions file capable of containing records subject to both ECP and non-ECP exceptions to thereby produce an electronic file of the which of the checks are properly payable by the payor bank and (3) electronically transmitting the electronic file to the presenting bank to thereby provide advance electronic return notification of both ECP and non-ECP exceptions to checks presented by the presenting bank to the payor bank.

Although the present invention and its advantages have been described in detail, it should be understood that various changes, substitutions and alterations can be made herein without departing from the spirit and scope of the invention as defined by the appended claims.

What is claimed is:

1. For use by a presenting bank and a payor bank having transaction presentment systems between which transaction-related data may be electronically transmitted, an accelerated method of clearing transactions drawn on the payor bank and received by the presenting bank for payment, said method comprising the steps of:

electronically transmitting, from the presenting bank to the payor bank, predetermined presentment information relating to the transactions and permitting a determination by the payor bank as to which of the transactions are properly payable by the payor bank;

reconciling, on a transaction-level basis at the payor bank, from the electronic presentment information received thereby and a non-MICR input file, which of the transactions are properly payable to allow the payor bank to detect potential fraud conditions; and electronically transmitting, from the payor bank to the presenting bank, a return notification listing of at least potentially returnable ones of the transactions.

2. The method of claim 1 further comprising the step of appending to the electronically transmitted presentment information a return notification eligibility flag to indicate whether a particular transaction, information about which forms a part of the presentment information, is eligible for a return notification, said appending step being carried out prior to said transmitting step.

3. The method of claim 2 wherein the eligibility flag comprises an indication that a particular transaction is not eligible for a return notification.

4. The method of claim 2 wherein the eligibility flag comprises an indication that a particular transaction requires at least one preliminary return notification and a final return notification.

5. The method of claim 2 wherein the eligibility flag comprises an indication that a particular transaction requires only a final return notification.

6. The method of claim 1 wherein said return notification comprises both a preliminary return notification and a final return notification.

7. The method of claim 1 wherein said return notification comprises only a final return notification that is transmitted by the payor bank to the presenting bank after a final pay/no pay decision has been made by the payor bank.

8. A system for use by a payor bank for generating and transmitting presenting bank a return notification relating to a potential return transaction previously presented, by a presenting bank, to the payor bank for payment, said system comprising:

means for receiving an electronic cash letter from the presenting bank, said cash letter including information regarding transactions being presented for payment by the payor bank and usable by the payor bank to detect potential return transactions from said information;

means for reconciling said electronic cash letter on an transaction-level basis and detecting therefrom and from a non-MICR input file transactions that may potentially be return transactions to allow the payor bank to detect potential fraud conditions; and means, responsive to the detection of potential return transactions, for electronically transmitting to the presenting bank a return notification.

9. The system of claim 8 wherein said electronic return notification comprises a preliminary notification of a potential return transaction that was generated following a DDA process performed by the payor bank but before a final pay/no pay decision by the payor bank.

10. The system of claim 8 wherein said electronic return notification comprises a final return notification generated by the payor bank following the payor bank making a pay/no pay decision.

11. The system of claim 8 wherein the electronic return notification comprises a confirmation notice that a particular transaction has been paid.

12. The system of claim 8 further comprising:

means for electronically returning a final return notification to the presenting bank, responsive to a final pay/no pay decision by a payor bank officer, said decision being made subsequent to said detection of transactions that may be potential return transactions and subsequent to an examination of said potential return transactions by the bank officer.

13. For use by a presenting bank and a plurality of payor banks, an electronic transaction presentment system facilitating rapid transaction processing communication between the presenting bank and the payor banks regarding payment of transactions drawn on the payor banks and received by the presenting bank for payment, said system comprising:

means, usable by the presenting bank, for capturing processing information from paper transactions received by the presenting bank for payment and drawn on the payor banks;

means for selectively extracting portions of the captured processing information grouped by payor bank;

means for incorporating the extracted processing information portions into electronic cash letters transmittable to the associated payor banks, each electronic cash letter containing transaction information usable by the receiving payor bank to permit it to make payment decisions relative to the transactions associated with the electronic cash letter;

means for electronically transmitting said cash letters from the presenting bank to the payor banks; and means, usable by the payor banks, for receiving the electronic cash letters and, in response to receipt thereof and from a non-MICR input file, reconciling said electronic cash letters on an transaction-level basis and electronically transmitting to the presenting bank at least preliminary transaction payment decisions based on the electronic information received from the presenting bank.

14. The electronic transaction presentment system of claim 13 further comprising:

means for storing and maintaining electronic records relating to the transmission to and receipt by the payor bank of said electronic cash letters.

15. The electronic transaction presentment system of claim 14 further comprising:

means for reconciling transmitted electronic cash letters with complementary paper cash letters, wherein said reconciling is accomplished by the payor bank by comparing the electronic cash letters with the corresponding paper cash letters.

16. The electronic transaction presentment system of claim 15 wherein said means for reconciling transmitted electronic cash letters with complementary paper cash letters includes means for handling out-of-sequence transactions during reconciliation.

17. The electronic transaction presentment system of claim 16 further comprising:

means for electronically generating and storing discrepancies between said electronic cash letters and said complementary paper cash letters identified by the payor bank in response to said reconciliation means.

18. For use by a presenting bank and a plurality of payor banks, an improved electronic transaction presentment system facilitating accelerated, paperless transaction processing between the presenting bank and the payor banks with regard to payment of transactions drawn on the payor banks and received by the presenting bank for payment, said system comprising:

means, usable by a presenting bank, for receiving a series of paper transactions;

means, usable by a presenting bank, for extracting selected transaction information from said paper transactions;

means for electronically transmitting the extracted transaction information from the presenting bank to the payor bank on which the transactions corresponding to the extracted information are drawn;

means, usable by the payor banks, for receiving the transmitted extracted transaction information and, in response thereto and from a non-MICR input file, reconciling said extracted transaction information on an transaction-level basis and electronically transmitting to the presenting bank a return notification comprising further electronic transaction information as to those transactions identified by the payor bank as exceptions; and means, usable by the presenting bank, for receiving the further electronic transaction information transmitted by the payor bank and utilizing it to correlate the further electronic transaction information with the paper transactions to which the further transaction information pertains.

19. For use by a presenting bank and a payor bank, an electronic transaction presentment system facilitating rapid processing of transactions drawn on the payor bank and received by the presenting bank for payment, said system comprising:

means, usable by the presenting bank, for capturing information from paper transactions presented for payment to the presenting bank and storing the captured information;

means for appending to the captured transaction information at least one disposition code providing, for use by the payor bank, instructions for handling transactions identified by the payor bank as potential return transactions;

means for electronically transmitting the encoded transaction information from the presenting bank to the payor bank; and means, usable by the payor bank, for receiving the encoded transaction information and, in response to receipt thereof and from a non-MICR input file, reconciling said encoded transaction level information on an transaction-level basis and electronically transmitting to the presenting bank a return notification in conformance with the disposition code instructions.

20. The system of claim 19 wherein said disposition code comprises an instruction to the payor bank that no return notification is to be generated by the payor bank.

21. The system of claim 20 wherein said disposition code comprises an instruction to the payor bank that a return notification is to be generated by the payor bank only for transactions having amounts greater than a predetermined amount.

22. The system of claim 20 wherein said disposition code comprises an instruction to the payor bank that a return notification is to be generated by the payor bank for all transactions identified by the payor bank as not payable.

23. The system of claim 20 wherein said disposition code comprises an instruction to the payor bank to reclear transactions identified as not payable by the payor bank if the transaction amount is less than a predetermined amount.

24. The system of claim 20 wherein said disposition code comprises an instruction to the payor bank to reclear all transactions identified as not payable by the payor bank.

25. The system of claim 20 wherein said disposition code comprises an instruction to the payor bank to provide a return notification for all transactions paid by the payor bank.

26. The system of claim 20 wherein said disposition code comprises an instruction to the payor bank to provide multiple preliminary notifications to the presenting bank.

27. For use by a presenting bank and its downstream correspondent banks and a plurality of payor banks, an electronic transaction presentment system facilitating rapid processing of transactions drawn on the payor bank and received by the presenting bank for payment and facilitating the rapid transmission of disposition information to the presenting bank's downstream correspondents, said system comprising:

- means, usable by the presenting bank, for capturing information from paper transactions presented to the presenting bank by a downstream correspondent bank for collection and storing the captured transaction information;
- means for electronically transmitting the captured transaction information from the presenting bank to the payor bank;
- means, usable by the payor bank, for receiving the transaction information and, in response to receipt thereof and from a non-MICR input file, reconciling said transaction information on an transaction-level basis and electronically transmitting to the presenting bank a return notification; and
- means, usable by the presenting bank, for receiving the electronically transmitted return notification and responsively thereto further transmitting the return notification to the downstream correspondent bank that previously presented to the presenting bank the transaction in relation to which the return notification was transmitted by the payor bank.

28. For use by a presenting bank and a payor bank, an electronic transaction presentment system for accelerated clearing of transactions drawn on the payor bank and received by the presenting bank for payment, and for providing to the presenting bank a return notification comprising transaction disposition information for transactions processed by the payor bank, said system comprising:

- means, usable by the presenting bank, for capturing information from paper transactions presented for payment to the presenting bank and storing the captured information;
- means for appending to the captured transaction information an eligibility code providing, for use by the payor bank, instructions for preparing return notifications for transmission to the presenting bank with regard to the transaction information processed by the payor bank;
- means for electronically transmitting the encoded transaction information from the presenting bank to the payor bank; and
- means, usable by the payor bank, for receiving the encoded transaction information and, in response to receipt thereof and from a non-MICR input file, reconciling said encoded transaction level information on an transaction-level basis and selectively electronically transmitting to the presenting bank a return notification in conformance with the eligibility code instructions.

* * * * *